United States Patent
Borran et al.

(10) Patent No.: US 8,831,607 B2
(45) Date of Patent: Sep. 9, 2014

(54) REVERSE LINK OTHER SECTOR COMMUNICATION

(75) Inventors: Mohammad J. Borran, San Diego, CA (US); Aamod Khandekar, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1073 days.

(21) Appl. No.: 11/620,035

(22) Filed: Jan. 4, 2007

(65) Prior Publication Data

US 2007/0207812 A1  Sep. 6, 2007

Related U.S. Application Data

(60) Provisional application No. 60/756,641, filed on Jan. 5, 2006.

(51) Int. Cl.
| | | |
|---|---|---|
| H04W 36/00 | (2009.01) | |
| H04W 36/18 | (2009.01) | |
| H04L 27/26 | (2006.01) | |
| H04L 1/18 | (2006.01) | |
| H04W 36/22 | (2009.01) | |
| H04L 1/00 | (2006.01) | |

(52) U.S. Cl.
CPC ....... H04W 36/22 (2013.01); *H04L 2001/0092* (2013.01); H04W 36/18 (2013.01); H04L 27/2608 (2013.01); H04L 1/1829 (2013.01)
USPC ........... 455/436; 455/442; 455/438; 455/437; 455/524; 455/422.1; 370/331; 370/329; 370/328; 370/341

(58) Field of Classification Search
USPC ........... 455/452.1, 456.1, 436, 442, 438, 437, 455/524, 422.1, 439, 452.2, 440, 450, 453, 455/502, 522; 370/473, 389, 331, 349, 329, 370/335, 328, 341; 375/260
See application file for complete search history.

(56) References Cited

U.S. PATENT DOCUMENTS

| | | | |
|---|---|---|---|
| 4,554,668 A | 11/1985 | Deman et al. | |
| 4,747,137 A | 5/1988 | Matsunaga | |

(Continued)

FOREIGN PATENT DOCUMENTS

| | | |
|---|---|---|
| AU | 2005319084 | 4/2010 |
| CA | 2348137 | 11/2001 |

(Continued)

OTHER PUBLICATIONS

Blum, R. et al., "On Optimum MIMO with Antenna Selection," IEEE International Conference on Communications: Conference Proceedings, vol. 1, Apr. 28, 2002, pp. 386-390.

(Continued)

*Primary Examiner* — Fred Casca
(74) *Attorney, Agent, or Firm* — Darren M. Simon

(57) ABSTRACT

Systems and methodologies are described that facilitate soft handoff and enhanced performance in a wireless communication environment. In multiple access systems, access points assign certain resources (e.g., time, frequency, code) to each terminal. This assignment information can also be provided to neighboring sectors, allowing such sectors to receive and decode terminal transmissions. The information can be provided via backhaul signaling. Decoding by sectors within the active set of the terminal facilitates smooth transition as terminals move between sectors during soft handoff. In addition, sectors can signal successful receipt and decoding of transmissions, avoiding redundant processing.

24 Claims, 17 Drawing Sheets

(56) References Cited

U.S. PATENT DOCUMENTS

| | | |
|---|---|---|
| 4,783,779 A | 11/1988 | Takahata et al. |
| 4,783,780 A | 11/1988 | Alexis |
| 5,465,253 A | 11/1995 | Rahnema |
| 5,583,869 A | 12/1996 | Grube et al. |
| 5,594,738 A | 1/1997 | Crisler et al. |
| 5,684,491 A | 11/1997 | Newman et al. |
| 5,745,487 A | 4/1998 | Hamaki |
| 5,790,537 A | 8/1998 | Yoon et al. |
| 5,812,938 A | 9/1998 | Gilhousen et al. |
| 5,828,650 A | 10/1998 | Malkamaki et al. |
| 5,870,393 A | 2/1999 | Yano et al. |
| 5,949,814 A | 9/1999 | Odenwalder et al. |
| 5,999,826 A | 12/1999 | Whinnett |
| 6,052,364 A | 4/2000 | Chalmers et al. |
| 6,067,315 A | 5/2000 | Sandin |
| 6,075,797 A | 6/2000 | Thomas |
| 6,088,345 A | 7/2000 | Sakoda et al. |
| 6,088,592 A | 7/2000 | Doner et al. |
| 6,108,550 A | 8/2000 | Wiorek et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,249,683 B1 | 6/2001 | Lundby et al. |
| 6,271,946 B1 | 8/2001 | Chang et al. |
| 6,310,704 B1 | 10/2001 | Dogan et al. |
| 6,317,435 B1 | 11/2001 | Tiedemann, Jr. et al. |
| 6,363,060 B1 | 3/2002 | Sarkar |
| 6,377,809 B1 | 4/2002 | Rezaiifar et al. |
| 6,393,008 B1 | 5/2002 | Cheng et al. |
| 6,393,012 B1 | 5/2002 | Pankaj |
| 6,401,062 B1 | 6/2002 | Murashima |
| 6,449,246 B1 | 9/2002 | Barton et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,501,810 B1 | 12/2002 | Karim et al. |
| 6,507,601 B2 | 1/2003 | Parsa et al. |
| 6,529,525 B1 | 3/2003 | Pecen et al. |
| 6,535,666 B1 | 3/2003 | Dogan et al. |
| 6,539,213 B1 | 3/2003 | Richards et al. |
| 6,542,743 B1 | 4/2003 | Soliman |
| 6,590,881 B1 | 7/2003 | Wallace et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,654,339 B1 | 11/2003 | Bohnke et al. |
| 6,658,258 B1 | 12/2003 | Chen et al. |
| 6,674,787 B1 | 1/2004 | Dick et al. |
| 6,690,951 B1 | 2/2004 | Cuffaro et al. |
| 6,704,571 B1 | 3/2004 | Moon |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,754,511 B1 | 6/2004 | Halford et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,842,487 B1 | 1/2005 | Larsson |
| 6,850,509 B2 | 2/2005 | Lee et al. |
| 6,904,283 B2 | 6/2005 | Li et al. |
| 6,907,020 B2 | 6/2005 | Periyalwar et al. |
| 6,917,602 B2 | 7/2005 | Toskala et al. |
| 6,917,821 B2 | 7/2005 | Kadous et al. |
| 6,934,275 B1 | 8/2005 | Love et al. |
| 6,940,827 B2 | 9/2005 | Li et al. |
| 6,940,842 B2 | 9/2005 | Proctor, Jr. |
| 6,963,543 B2 | 11/2005 | Diep et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,498 B2 | 1/2006 | Laroia et al. |
| 6,987,746 B1 | 1/2006 | Song |
| 7,006,848 B2 | 2/2006 | Ling et al. |
| 7,009,500 B2 | 3/2006 | Rao et al. |
| 7,016,318 B2 | 3/2006 | Pankaj et al. |
| 7,023,880 B2 | 4/2006 | El-Maleh et al. |
| 7,042,856 B2 | 5/2006 | Walton et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,106,319 B2 | 9/2006 | Ishiyama |
| 7,120,134 B2 | 10/2006 | Tiedemann, Jr. et al. |
| 7,157,351 B2 | 1/2007 | Cheng et al. |
| 7,164,696 B2 | 1/2007 | Sano et al. |
| 7,170,937 B2 | 1/2007 | Zhou |
| 7,177,351 B2 | 2/2007 | Kadous |
| 7,181,170 B2 | 2/2007 | Love et al. |
| 7,184,713 B2 | 2/2007 | Kadous et al. |
| 7,188,300 B2 | 3/2007 | Eriksson et al. |
| 7,215,979 B2 | 5/2007 | Nakagawa et al. |
| 7,230,941 B2 | 6/2007 | Odenwalder et al. |
| 7,233,634 B1 | 6/2007 | Hassell Sweatman et al. |
| 7,260,153 B2 | 8/2007 | Nissani |
| 7,292,651 B2 | 11/2007 | Li |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,369,531 B2 | 5/2008 | Cho et al. |
| 7,403,748 B1 | 7/2008 | Keskitalo et al. |
| 7,433,661 B2 | 10/2008 | Kogiantis et al. |
| 7,443,835 B2 | 10/2008 | Lakshmi Narayanan et al. |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,471,963 B2 | 12/2008 | Kim et al. |
| 7,508,748 B2 | 3/2009 | Kadous |
| 7,545,867 B1 | 6/2009 | Lou et al. |
| 7,551,564 B2 | 6/2009 | Mattina |
| 7,599,327 B2 | 10/2009 | Zhuang |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,031,583 B2 | 10/2011 | Classon et al. |
| 8,095,141 B2 | 1/2012 | Teague |
| 8,098,568 B2 | 1/2012 | Laroia et al. |
| 8,098,569 B2 | 1/2012 | Laroia et al. |
| 8,446,892 B2 | 5/2013 | Ji et al. |
| 8,462,859 B2 | 6/2013 | Sampath et al. |
| 8,477,684 B2 | 7/2013 | Khandekar et al. |
| 8,582,509 B2 | 11/2013 | Khandekar et al. |
| 8,582,548 B2 | 11/2013 | Gore et al. |
| 2001/0021180 A1 | 9/2001 | Lee et al. |
| 2001/0024427 A1 | 9/2001 | Suzuki |
| 2001/0030948 A1 | 10/2001 | Tiedemann, Jr. |
| 2001/0053140 A1 | 12/2001 | Choi et al. |
| 2002/0015405 A1 | 2/2002 | Sepponen et al. |
| 2002/0018157 A1 | 2/2002 | Zhang et al. |

(56) References Cited

U.S. PATENT DOCUMENTS

| | | |
|---|---|---|
| 2002/0061742 A1 | 5/2002 | Lapaille et al. |
| 2002/0085521 A1 | 7/2002 | Tripathi et al. |
| 2002/0090004 A1 | 7/2002 | Rinchiuso |
| 2002/0122400 A1 | 9/2002 | Vayanos et al. |
| 2002/0128035 A1 | 9/2002 | Jokinen et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0176398 A1 | 11/2002 | Nidda |
| 2002/0193146 A1 | 12/2002 | Wallace et al. |
| 2003/0002464 A1 | 1/2003 | Rezaiifar et al. |
| 2003/0027579 A1 | 2/2003 | Sydon |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086393 A1 | 5/2003 | Vasudevan et al. |
| 2003/0103520 A1 | 6/2003 | Chen et al. |
| 2003/0112745 A1 | 6/2003 | Zhuang et al. |
| 2003/0123414 A1 | 7/2003 | Tong et al. |
| 2003/0142648 A1* | 7/2003 | Semper ................. 370/331 |
| 2003/0147371 A1 | 8/2003 | Choi et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0228850 A1 | 12/2003 | Hwang |
| 2004/0002364 A1 | 1/2004 | Trikkonen et al. |
| 2004/0058687 A1 | 3/2004 | Kim et al. |
| 2004/0066772 A1 | 4/2004 | Moon et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081195 A1 | 4/2004 | El-Maleh et al. |
| 2004/0087325 A1 | 5/2004 | Cheng et al. |
| 2004/0097215 A1 | 5/2004 | Abe et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0170152 A1 | 9/2004 | Nagao et al. |
| 2004/0179480 A1 | 9/2004 | Attar et al. |
| 2004/0179494 A1 | 9/2004 | Attar et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0202257 A1 | 10/2004 | Mehta et al. |
| 2004/0208138 A1 | 10/2004 | Hayashi et al. |
| 2004/0224711 A1* | 11/2004 | Panchal et al. ................ 455/518 |
| 2004/0228313 A1 | 11/2004 | Cheng et al. |
| 2004/0240419 A1 | 12/2004 | Abrishamkar et al. |
| 2004/0252529 A1 | 12/2004 | Huber et al. |
| 2004/0252662 A1 | 12/2004 | Cho |
| 2004/0264507 A1 | 12/2004 | Cho et al. |
| 2005/0002440 A1 | 1/2005 | Alamouti et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0030886 A1 | 2/2005 | Wu et al. |
| 2005/0034079 A1 | 2/2005 | Gunasekar et al. |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0053081 A1 | 3/2005 | Andersson et al. |
| 2005/0068921 A1 | 3/2005 | Liu |
| 2005/0084000 A1 | 4/2005 | Krauss et al. |
| 2005/0085236 A1 | 4/2005 | Gerlach et al. |
| 2005/0135498 A1 | 6/2005 | Yee |
| 2005/0141624 A1 | 6/2005 | Lakshmipathi et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0180311 A1 | 8/2005 | Wang et al. |
| 2005/0180313 A1 | 8/2005 | Kim et al. |
| 2005/0192011 A1* | 9/2005 | Hong et al. ................... 455/440 |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0239465 A1* | 10/2005 | Lee et al. ................ 455/436 |
| 2005/0249266 A1 | 11/2005 | Brown et al. |
| 2005/0254467 A1 | 11/2005 | Li et al. |
| 2005/0259005 A1 | 11/2005 | Chiang et al. |
| 2005/0265293 A1 | 12/2005 | Ro et al. |
| 2005/0265470 A1 | 12/2005 | Kishigami et al. |
| 2005/0276348 A1 | 12/2005 | Vandenameele |
| 2005/0277423 A1 | 12/2005 | Sandhu et al. |
| 2005/0282500 A1 | 12/2005 | Wang et al. |
| 2006/0013285 A1 | 1/2006 | Kobayashi et al. |
| 2006/0018336 A1 | 1/2006 | Sutivong et al. |
| 2006/0029289 A1* | 2/2006 | Yamaguchi et al. .......... 455/436 |
| 2006/0034173 A1 | 2/2006 | Teague et al. |
| 2006/0039332 A1* | 2/2006 | Kotzin .................. 370/338 |
| 2006/0039500 A1 | 2/2006 | Yun et al. |
| 2006/0057958 A1 | 3/2006 | Ngo et al. |
| 2006/0078075 A1 | 4/2006 | Stamoulis et al. |
| 2006/0083183 A1 | 4/2006 | Teague et al. |
| 2006/0092054 A1 | 5/2006 | Li et al. |
| 2006/0104333 A1 | 5/2006 | Rainbolt et al. |
| 2006/0104381 A1 | 5/2006 | Menon et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0133269 A1 | 6/2006 | Prakash et al. |
| 2006/0133455 A1 | 6/2006 | Agrawal et al. |
| 2006/0153239 A1 | 7/2006 | Julian et al. |
| 2006/0156199 A1 | 7/2006 | Palanki et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0262754 A1 | 11/2006 | Andersson et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0292989 A1* | 12/2006 | Gerlach et al. ............... 455/63.1 |
| 2007/0004430 A1 | 1/2007 | Hyun et al. |
| 2007/0005749 A1 | 1/2007 | Sampath |
| 2007/0019596 A1 | 1/2007 | Barriac et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0053383 A1 | 3/2007 | Choi et al. |
| 2007/0060178 A1 | 3/2007 | Gorokhov et al. |
| 2007/0070952 A1 | 3/2007 | Yoon et al. |
| 2007/0071147 A1 | 3/2007 | Sampath et al. |
| 2007/0097897 A1 | 5/2007 | Teague et al. |
| 2007/0097909 A1 | 5/2007 | Khandekar et al. |
| 2007/0097927 A1 | 5/2007 | Gorokhov et al. |
| 2007/0097942 A1 | 5/2007 | Gorokhov et al. |
| 2007/0110172 A1 | 5/2007 | Faulkner et al. |
| 2007/0149194 A1 | 6/2007 | Das et al. |

(56) References Cited

U.S. PATENT DOCUMENTS

| | | |
|---|---|---|
| 2007/0149228 A1 | 6/2007 | Das |
| 2007/0159969 A1 | 7/2007 | Das et al. |
| 2007/0211667 A1 | 9/2007 | Agrawal et al. |
| 2007/0242653 A1 | 10/2007 | Yang et al. |
| 2007/0281702 A1* | 12/2007 | Lim et al. ............... 455/442 |
| 2008/0151829 A1 | 6/2008 | Khandekar et al. |
| 2008/0214222 A1 | 9/2008 | Atarashi et al. |
| 2008/0299983 A1* | 12/2008 | Kwak et al. ............... 455/446 |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 009531997 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 29032006 | 5/2007 |
| CL | 29062006 | 5/2007 |
| CL | 29042006 | 6/2007 |
| CL | 33882005 | 6/2007 |
| CL | 29022006 | 7/2007 |
| CL | 29082006 | 10/2007 |
| CL | 29012006 | 1/2010 |
| CL | 29072006 | 1/2010 |
| CN | 1252919 | 5/2000 |
| CN | 1267437 A | 9/2000 |
| CN | 1284795 | 2/2001 |
| CN | 1296682 | 5/2001 |
| CN | 1344451 A | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 | 7/2005 |
| CN | 1642051 A | 7/2005 |
| CN | 1642335 A | 7/2005 |
| CN | 1647436 | 7/2005 |
| DE | 10240138 | 8/2003 |
| DE | 10254384 | 6/2004 |
| EP | 0488976 | 6/1992 |
| EP | 0568291 A2 | 11/1993 |
| EP | 0740431 A1 | 10/1996 |
| EP | 0805576 A2 | 11/1997 |
| EP | 0807989 A1 | 11/1997 |
| EP | 1047209 A1 | 10/2000 |
| EP | 1093241 A1 | 4/2001 |
| EP | 1180907 A2 | 2/2002 |
| EP | 1255369 | 11/2002 |
| EP | 1267513 | 12/2002 |
| EP | 1074099 B1 | 2/2003 |
| EP | 1335504 A2 | 8/2003 |
| EP | 1351538 A1 | 10/2003 |
| EP | 1392073 A1 | 2/2004 |
| EP | 1434365 A2 | 6/2004 |
| EP | 1441469 A2 | 7/2004 |
| EP | 1465449 A1 | 10/2004 |
| EP | 1531575 A2 | 5/2005 |
| EP | 1898542 A1 | 3/2008 |
| EP | 1941693 | 7/2011 |
| FR | 2584884 | 1/1987 |
| IL | 201872 | 5/2012 |
| JP | H04111544 A | 4/1992 |
| JP | 4301931 A | 10/1992 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000102065 A | 4/2000 |
| JP | 2000184425 | 6/2000 |
| JP | 2000511750 A | 9/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |

(56) References Cited

FOREIGN PATENT DOCUMENTS

| | | |
|---|---|---|
| JP | 2003199173 A | 7/2003 |
| JP | 2003520523 | 7/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005502218 A | 1/2005 |
| JP | 2005506757 | 3/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2007500486 A | 1/2007 |
| JP | 2007503790 | 2/2007 |
| JP | 2007519281 | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 6/1998 |
| KR | 20000060428 | 10/2000 |
| KR | 20010056333 | 4/2001 |
| KR | 20010087715 A | 9/2001 |
| KR | 20030035969 A | 5/2003 |
| KR | 20040063057 | 7/2004 |
| KR | 200471652 | 8/2004 |
| KR | 100606099 | 7/2006 |
| KR | 101046824 | 6/2011 |
| RU | 95121152 | 12/1997 |
| RU | 2141168 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2197778 C2 | 1/2003 |
| RU | 2201033 C2 | 3/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 C1 | 10/2004 |
| RU | 2292655 | 10/2004 |
| RU | 2242091 C2 | 12/2004 |
| RU | 2003125268 | 2/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2335864 C2 | 10/2008 |
| RU | 2349043 C2 | 3/2009 |
| SU | 1320883 | 6/1987 |
| TW | 510132 | 11/2002 |
| TW | 200302642 | 8/2003 |
| TW | I232040 | 5/2005 |
| TW | 200718128 | 5/2007 |
| WO | WO9408432 | 4/1994 |
| WO | WO9701256 | 1/1997 |
| WO | WO9737456 A2 | 10/1997 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | WO9953713 | 10/1999 |
| WO | 0004728 | 1/2000 |
| WO | WO0002397 | 1/2000 |
| WO | WO0033503 | 6/2000 |
| WO | 0041542 | 7/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO0145300 | 6/2001 |
| WO | 0165637 A2 | 9/2001 |
| WO | WO0169814 A1 | 9/2001 |
| WO | WO0182543 | 11/2001 |
| WO | WO0193505 | 12/2001 |
| WO | WO0207375 | 1/2002 |
| WO | WO0215616 | 2/2002 |
| WO | 0245293 A2 | 6/2002 |
| WO | WO0245456 A1 | 6/2002 |
| WO | WO0249305 A2 | 6/2002 |
| WO | WO0249385 A2 | 6/2002 |
| WO | WO02060138 | 8/2002 |
| WO | WO02065675 | 8/2002 |
| WO | 02082689 A2 | 10/2002 |
| WO | WO02093782 A1 | 11/2002 |
| WO | WO02093819 A1 | 11/2002 |
| WO | WO02100027 A1 | 12/2002 |
| WO | WO03001761 A1 | 1/2003 |
| WO | WO03019819 | 3/2003 |
| WO | WO03030414 | 4/2003 |
| WO | WO03034644 A1 | 4/2003 |
| WO | WO03043262 | 5/2003 |
| WO | WO03043369 | 5/2003 |
| WO | 03049409 A2 | 6/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 | 9/2003 |
| WO | 03088538 A1 | 10/2003 |
| WO | WO03085876 | 10/2003 |
| WO | WO03094384 | 11/2003 |
| WO | 04002011 A1 | 12/2003 |
| WO | WO03103331 | 12/2003 |
| WO | WO2004004370 | 1/2004 |
| WO | WO2004008671 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | 2004038984 A2 | 5/2004 |
| WO | WO2004038954 | 5/2004 |

(56) References Cited

FOREIGN PATENT DOCUMENTS

| WO | WO2004047354 | 6/2004 |
|---|---|---|
| WO | WO2004049618 A1 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO2004095730 A1 | 11/2004 |
| WO | WO2004095854 | 11/2004 |
| WO | WO2004098222 | 11/2004 |
| WO | WO2004102815 | 11/2004 |
| WO | WO2004102816 A2 | 11/2004 |
| WO | 2004105272 A1 | 12/2004 |
| WO | 2004114564 A1 | 12/2004 |
| WO | 2004114615 A1 | 12/2004 |
| WO | WO2004114549 | 12/2004 |
| WO | 2005011163 A1 | 2/2005 |
| WO | WO2005015810 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | 2005032004 A1 | 4/2005 |
| WO | 2005043780 A1 | 5/2005 |
| WO | WO2005043855 | 5/2005 |
| WO | WO2005046080 | 5/2005 |
| WO | 2005055484 A1 | 6/2005 |
| WO | WO2005060192 A1 | 6/2005 |
| WO | WO2005074184 | 8/2005 |
| WO | 2005086440 A1 | 9/2005 |
| WO | WO2005122628 | 12/2005 |
| WO | 2006007292 A2 | 1/2006 |
| WO | WO2006019710 | 2/2006 |
| WO | WO2006044487 | 4/2006 |
| WO | 2006062356 A1 | 6/2006 |
| WO | WO2006069300 | 6/2006 |
| WO | WO2006069397 | 6/2006 |
| WO | WO2006077696 | 7/2006 |
| WO | WO2006138581 A2 | 12/2006 |
| WO | 2007022430 A2 | 2/2007 |
| WO | WO2007025160 | 3/2007 |

OTHER PUBLICATIONS

Catreux, S. et al., "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/iel5/7153/19260/00891306.pdf?tp=&isnumber=19260&arnumber=8913063 &punumber=7153.

Chung, S. et al., "Low complexity algorithm for rate and power quantization in extended V-BLAST" VTC FALL 2001. IEEE 54th. Vehicular Technology Conference Proceedings. Atlantic City, NJ, Oct. 7-11, 2001, vol. 1 of 4, pp. 910-914, Conf. 54.

Dai, Y. et al., "A List Sphere Decoder based turbo receiver for groupwise space time trellis coded (GSTTC) systems," 2004 IEEE 59thVehicular Technology Conference, vol. 2, pp. 804-808, May 17, 2004, doi: 10.1109/VETECS.2004.1388940.

El Gamal, H. et al., "Universal Space-Time Coding," IEEE Transactions on Information Theory, vol. 49, Issue 5, pp. 1097-1119, XP011074756, ISSN: 0018-9448, May 2003.

Guo, K. Et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.

Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).

Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.

Kousa, M. et al., "Adaptive Binary Coding for Diversity Communication Systems" IEEE International Conference on Personal Wireless Communications Proceedings, pp. 80-84, XP000992269, (1997).

Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.

Nokia, "Uplink Considerations for UTRA LTE", 3GPP TSG RAN WG1#40bis, Beijing, CN, R1-050251, 3GPP, Apr. 4, 2005, pp. 1-9.

NTT DoCoMo, "Downlink Multiple Access Scheme for Evolved UTRA", 3GPP R1-050249, 3GPP, Apr. 4, 2005, pp. 1-8.

Prasad, N. et al., "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.

QUALCOMM Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, no. San Diego, USA; 20051004, Oct. 4, 2005, pp. 1-10, XP050100715.

S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.

Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.

Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.

Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 Nov. 15, 2011.

Voltz, P. J.,"Characterization of the optimum transmitter correlation matrix for MIMO with antenna subset selection", IEEE Transactions on Communications, vol. 51, No. 11, pp. 1779-1782, Nov. 1, 2003.

Widdup, B. et al., "A highly-parallel VLSI architecture for a list sphere detector," IEEE International Conference, Paris, France, vol. 5, pp. 2720-2725 (2004).

Wiesel, A., et al., "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, p. 36-40, XP010713463.

Processing Advances in Wireless Communications, 2003, SPAWC 200 3. 4th IEEE Workshop on Rome. Italy Jun. 15-18, 2013, Piscataway, NJ, USA, IEEE, US, Jun. 15, 2003, pp. 36-40, XP010713463.

Digital cellular telecommunications system (Phase 2+); General Packet Radio Service (GPRS); Mobile Station (MS)—Base Station System (BSS)interface; Radio Link Control/Medium Access Control (RLC/MAC) protocol (GSM 04.60 version 8.4.1 Release 1999), 3GPP Standard; ETSI EN 301 349, 3RD Generation Partnership Project (3GPP), Mobile Competence Centre ; 650, Route Des Lucioles ; F-06921 Sophia-Antipolis Cedex ; France, No. V8.4.1, Oct. 1, 2000, pp. 1-243, XP050358534.

Tomcik J., "QFDD and QTDD: Proposed Draft Air Interface Specification," IEEE C802.20-05/69, IEEE 802.20 Working Group on Mobile Broadband Wireless Access, Oct. 28, 2005, P.1-6,1-7,1-16,6-65,7-11,7-33,7-37-7-55,9-21,9-22,9-24-9-32.

Anonymous: "3GPP TS 36.211 V8.0.0; Evolved Universal Terrestrial Radio Access (E-UTRA); Physical channels and modulation

(56) References Cited

OTHER PUBLICATIONS (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Bhushan N., "UHDR Overview", C30-20060522-037, Denver, CO, May 22, 2006, pp. 1-115.
Jim Tomcik, QFDD and QTDD: Technology Overview, IEEE 802.20 Working Group on Mobile Broadband Wireless Access, Oct. 28, 2005, pp. 48-50, URL, HTTP://WWW.IEEE802.ORG/20/CONTRIBS/C802.20-05-68.ZIP.
LG Electronics: "PAPR comparison of uplink MA schemes", 3GPP TSG RAN WG1 Meeting #41, R1-050475, May 9-13, 2005, pp. 6.
Miorandi D., et al., "Analysis of master-slave protocols for real-time industrial communications over IEEE 802.11 WLANs" Industrial Informatics, 2004. Indin '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Motorola,"Uplink Numerology and Frame Structure", 3GPP TAG RAN1 #41 Meeting R1-050397, May 13, 2005.
Nokia: "Compact signalling of multi-code allocation for HSDPA", version 2,3GPP R1-02-0018, Jan. 11, 2002.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/ [retrieved on Feb. 7, 2012].
Samsung: "Uplink Transmission and Multiplexing for EUTRA", 3GPP DRAFT; R1-050605 UL Multiplexing, Jun. 16, 2005, XP050111420.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Tachikawa (Editor); "W-CDMA Mobile Communication Systems," John Wiley & Sons Ltd., Japan, Maruzen: pp. 82-213, Jun. 25, 2001.
Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
European Search Report—EP10184156—Search Authority—Munich—Jun. 14, 2012 (050676U2EPD1D2).
Ken Murakami et al., "Status Toward Standardization at IEEE 802.3ah and items on the construction of GE-PON system ," Technical Report of the Institute of Electronics, Information and Communication Engineers, Jun. 13, 2003, vol. 103, No. 124, pp. 1-6, IN2003-24.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Yatawatta, S. et al., "Energy Efficient Channel Estimation in MIMO Systems", 2005 IEEE International Conference on Acoustics, Speech, and Signal Processing, March 18-23, 2005, Philadelphia, vol. 4, pp. 317-320, Mar. 18, 2005.

\* cited by examiner

REVERSE LINK OTHER SECTOR COMMUNICATION

CROSS-REFERENCE

This application claims the benefit of U.S. Provisional Application Ser. No. 60/756,641 entitled "REVERSE LINK SOFT HANDOFF AND DECODING IN ORTHOGONAL FREQUENCY DIVISION MULTIPLE ACCESS COMMUNICATIONS SYSTEMS," filed on Jan. 5, 2006. The entirety of the above-referenced application is incorporated herein by reference.

The present Application for Patent is a continuation-in-part of patent application Ser. No. 11/261,159 entitled "REVERSE LINK SOFT HANDOFF IN A WIRELESS MULTIPLE-ACCESS COMMUNICATION SYSTEM" filed Oct. 27, 2005, pending, and assigned to the assignee hereof and hereby expressly incorporated by reference herein.

BACKGROUND

I. Field

The following description relates generally to wireless communications, and, amongst other things, communication between a terminal and a non-serving sector.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Generally, access points assign various resources to individual terminals supported by the access point.

Typically, each access point supports terminals located within a specific coverage area referred to as a sector. A sector that supports a specific terminal is referred to as the serving sector. Other sectors, not supporting the specific terminal, are referred to as non-serving or neighboring sectors. Terminals within a sector can be allocated specific resources to allow simultaneous support of multiple terminals.

As wireless systems and terminals have become more prevalent users have come to expect and require reliable connections. Additionally, systems are required to support movement of terminals between sectors due to the portable nature of many terminals (e.g., mobile phones, laptops). Moreover, increasingly complex data is communicated via terminals. Users require rapid transmission of data intensive media (e.g., image and video).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with soft handoff and enhanced performance in a wireless system. In particular, a serving sector can provide assignment information associated with supported terminals to neighboring sectors. The assignment information can be provided to sectors within the active set of the supported terminal via backhaul signaling. The sectors can utilize the assignment information to receive and decode terminal transmissions, facilitating soft handoff of terminals. In aspects, the sectors can coordinate to balance load. In particular, the first sector that successfully receives and decodes a terminal transmission can notify other sectors, thereby avoiding duplicative processing.

In an aspect, a method for facilitating reverse link communication between a terminal and a non-serving sector in a wireless environment that comprises transmitting assignment information to a terminal, and transmitting the assignment information to a neighboring sector. The assignment information includes a resource allocated to the terminal by a serving sector and the neighboring sector processes a reverse link transmission from the terminal based at least in part upon the assignment information.

In another aspect, an apparatus that facilitates other sector communication in a wireless environment that comprises a memory that stores a communication and processor that executes instructions for receiving assignment information for a terminal from a serving sector that supports the terminal and processing the communication provided by the terminal based at least in part upon the received assignment information.

According to yet another aspect, an apparatus that facilitates other sector communication that comprises means for transmitting a resource assignment to a terminal and means for providing resource assignment information to a neighboring sector. The neighboring sector processes a reverse link transmission from the terminal based at least in part upon the resource assignment information.

According to another aspect, computer-readable medium having instructions for sending a resource allocation instruction to a terminal and sending resource allocation information to an access point that uses the resource allocation information to process a data packet transmitted by the terminal.

Yet another aspect relates to a processor that executes instructions for receiving resource allocation information associated with a user device from a serving sector, receiving at least one data packet from the user device and processing the at least one data packet as a function of the resource allocation information.

To the accomplishment of the foregoing and related ends, the one or more aspects comprise the features hereinafter fully described and particularly pointed out in the claims. The following description and the annexed drawings set forth in detail certain illustrative aspects. These aspects are indicative, however, of but a few of the various ways in which the principles described herein may be employed and the described are intended to include their equivalents.

DETAILED DESCRIPTION

Figure 1:
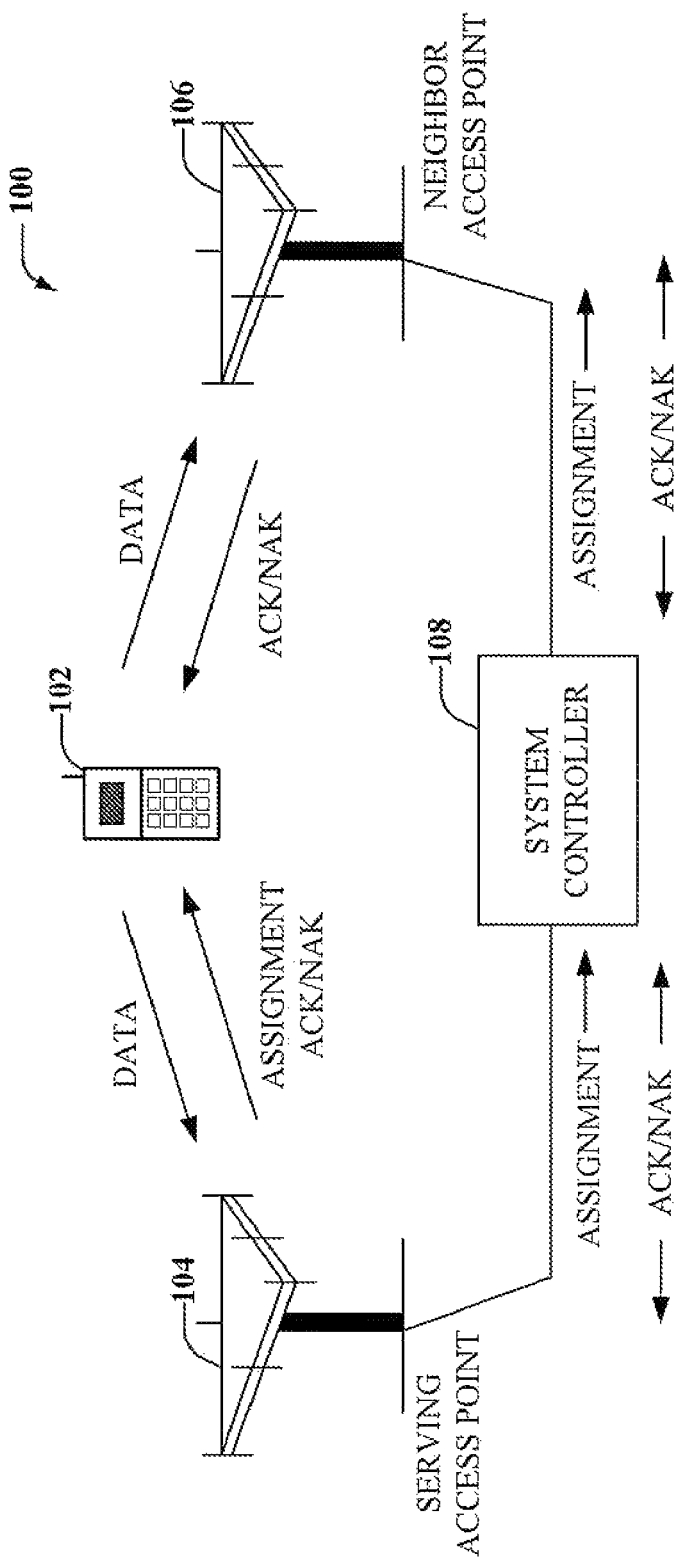
FIG. 1 is a block diagram of a system that facilitates reverse link communication with non-serving sectors in accordance with one or more aspects presented herein.

Various aspects are now described with reference to the drawings, wherein like reference numerals are used to refer to like elements throughout. In the following description, for purposes of explanation, numerous specific details are set forth in order to provide a through understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a terminal. A terminal can also be called a system, a user device, a subscriber unit, subscriber station, mobile station, mobile device, remote station, access point, base station, remote terminal, access terminal, user terminal, terminal, user agent, or user equipment (UE). A terminal can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Typically, a sector supports multiple terminals. The term "sector" can refer to an access point and/or an area covered by an access point, depending upon context. In particular, sectors provide service to multiple terminals by sharing the available system resources (e.g., bandwidth and transmit power). Sectors assign various resources to individual terminals. Generally, access points assign various resources to individual terminals supported by the access point.

An orthogonal frequency division multiple access (OFDMA) system utilizes orthogonal frequency division multiplexing (OFDM). OFDM is a multi-carrier modulation technique that partitions the overall system bandwidth into multiple (N), distinct orthogonal frequency subcarriers. These subcarriers may also be called tones, bins, and frequency channels. For example, the frequency spectrum or band allocated for wireless cellular telephone communication can be split into 30 channels, each of which can carry a voice conversation or, for digital service, digital data. Each channel can be assigned to only one user device or terminal at a time. Each channel is associated with a respective subcarrier that may be modulated with data. Up to N modulation symbols may be sent on the N total subcarriers in each OFDM symbol period. These modulation symbols can be converted to the time-domain with an N-point inverse fast Fourier transform (IFFT) to generate a transformed symbol that contains N time-domain chips or samples.

Resources are typically assigned by the serving sector that supports the terminal. Without information regarding resources assigned to a specific terminal, it can be difficult for non-serving sectors to decode or even receive transmissions from the terminal. However, there are several circumstances in which it is beneficial for non-serving sectors to decode reverse link transmissions by a terminal. For example, if the terminal is mobile, it can move from the coverage area of one sector to the coverage area of a second sector. To avoid disruption of service and provide a smooth transition, neighboring sectors can receive and decode reverse link transmissions prior to handoff from the original serving sector to the new sector. In addition, decoding of transmissions by neighboring sectors can increase system reliability. If the serving sector experiences interference or other problems, a neighboring sector can support the terminal, providing redundancy and mitigating possible errors.

To receive and decode reverse link transmissions, neighboring sectors can require resource assignment information (e.g., frequency channel or code). In a system with scheduled reverse link (RL) transmission, the serving sector can send an assignment to the target terminal through an over the air message specifying the resources (e.g., frequency, time and code) assigned to the terminal as well as the coding and modulation to be used for the transmission. Terminals utilize the assigned resources for reverse link transmissions.

In certain communication systems, non-serving sectors can receive and decode reverse link transmissions, referred to herein as other sector communication. The prefix of the data transmission often includes the MACID of a terminal and the packet format that is used, so as to enable decoding at non-serving sectors. This information may be in the preamble, the data itself, or communicated as a separate control channel message. This information needs to be detected with high reliability to avoid loss of data. In a CDMA system, the information could be included with a preamble which is scrambled with a MACID specific scrambling sequence. At the receiver, a descrambler is used to detect the user's transmission; then the packet format is detected following which the data demodulation and decoding are attempted.

However, reception and decoding are more complicated in an orthogonal frequency division multiple access (OFDMA) system. In an OFDMA system, different combinations of subcarriers are assigned for each transmission. Because neighboring sectors have no information as to the particular subcarriers assigned to a terminal, the neighboring sector's receiver would have to detect a terminal's preamble transmission over all possible reverse link channels. Once detected, the preamble would have to include the terminal's MACID and packet format. In addition, if detection of the preamble is not reliable, the neighboring sector will waste resources attempting to receive terminal transmissions over the entire available bandwidth. Additionally, transmission efficiency is relatively poor for small packets, such as the preamble. The factors result in inefficient other sector communication in OFDMA systems.

With reference now to the drawings. FIG. 1 illustrates a block diagram of a system 100 that facilitates receipt of reverse link transmissions by non-serving sectors. System 100 includes a terminal 102 supported by an access point 104. System 100 can also include a nearby, non-serving access point 106, referred to as a neighbor sector. A single serving access point, terminal and neighbor access point are illustrated for simplicity. However, system 100 can include multiple access points and terminals. System 100 can also include a system controller 108 that couples serving access point 102 and neighbor access point 106 and provides coordination and control of access points.

In system 100, serving access point 104 can assign resources to terminal 102 for reverse link transmissions. Serving access point 104 can also provide the assignment information (e.g., frequency, time and code) to one or more neighbor access points 106. For an OFDMA system, serving access point 104 can provide subcarrier information to system controller 108, which can pass such information on to neighbor access point 106. Neighbor access point 106 can utilize the provided assignment information to detect transmissions on specified subcarriers and to decode received transmissions from terminal 102.

Communication among access points can also be effectuated using a wireless channel dedicated to sharing of assignment information (e.g., a reverse link rate indicator (RRI)). However, such a channel requires bandwidth allocated solely to this purpose. To maximize bandwidth that can be used for transmission of data, backhaul signaling can be utilized for transmission of assignment information. As used herein, backhaul signaling refers to transmissions via any suitable wired communication (e.g., T1 lines), as opposed to over the air transmissions.

Assignment information can be passed to neighbor access points that appear within the active set of the terminal, referred to herein as active terminals or sectors. Terminals typically maintain a list of access points from which a relatively strong signal is received, referred to as the active set of the terminal. Therefore, access points in the active set are most likely to be capable of receiving transmissions from the terminal. In general, access points within the active set are proximate to the serving access point. Consequently, during handoff, when a mobile terminal and moves between access points, the terminal is most likely to move from the serving sector into an the sector of an access point in the active set. As a result, it can be particularly beneficial for access points in the active set to decode packets or transmissions received from the terminal. If terminals are able to make a connection with another access point prior to breaking off communication with the old serving access point, dissruption of service is minimized. Providing assignment information to access points in the active set allows such access points to receive and decode packets prior to handoff. System 100 can be utilized in a variety of multiple access systems, including, but not limited to, an OFDMA system, an interleaved frequency division multiple access (IFDMA) system and a localized frequency division multiple access (LFDMA) system.

System 100 can utilize acknowledgement signals to reduce possible errors and minimize packet loss. As illustrated in FIG. 1, serving access point 104 can send an acknowledgement (ACK) to terminal upon receiving and decoding a transmission. Upon receipt of the acknowledgement, terminal can provide additional transmissions or packets. Similarly, serving access point 104 can send a negative acknowledgement (NAK) to terminal 102 to indicate error. Terminal 102 can retransmit packets in response to a NAK. If no acknowledgement is received, terminal can repeat the transmission to ensure that data is not lost.

A series of acknowledgements or notifications can also be used to optimize processing of reverse link transmissions. The first access point to successfully complete decoding of a transmission can send an acknowledgement to other access points. The acknowledgement can include the decoded data and can be provided via backhaul signaling. Once the serving access point is aware that the transmission has been decoded, whether by decoding the packets or receipt of an acknowledgement, serving access point can transmit an acknowledgement to the terminal and can also notify neighboring access points, causing such access points to cease processing of the transmission. Therefore, transmission is decoded by the first access point that has sufficient bandwidth to process the transmission. Any further processing can be terminated after a successful decoding to reduce redundant processing and wasted computations.

Acknowledgements and notifications can be used to effectuate load balancing among a set of access points. The serving access point and neighboring access points can be coordinated to ensure that the transmission is decoded in the least possible time. For example, when a serving access point is processing a large volume of packets from multiple terminals, a neighboring access point that supports fewer terminals and can decode a particular transmission more rapidly than the serving access point. The access point that decodes the transmission can provide a simple notification to the serving access point or the decoded data. Using the neighboring access point with the available resources to process the transmission can optimize performance.

Distribution of transmission processing can also reduce errors and packet loss. While the serving access point is most likely to receive a strong signal from terminal, under certain conditions, one of the neighboring access points can receive a better signal. For example, signals can be affected by certain atmospheric conditions, geographic features as well as movement of the terminal. Any of these can cause a down fade at the serving access point, at the same time as a neighboring access point experiences an up fade. When serving access point is unable to successfully decode the transmission, a neighboring access point may be able to process the transmission.

Access points can also transmit an acknowledgement or signal at the beginning of transmission packet processing to indicate to other sectors that the transmission is being processed and avoid redundant decoding of the transmission. Once an access point commences processing, it can signal other access points, including the serving access point. Access points receiving this signal can retain the transmission for possible later use, but will not begin processing the transmission. If the processing access point is unable to complete processing (e.g., due to error), the processing access point can send a second signal indicating that decoding was unsuccessful. Any other access point can then proceed with decoding the transmission. The next access point that begins processing the transmission can also transmit a signal to other access points, to avoid duplicative processing of the transmission. This process can continue until the transmission is successfully decoded and the terminal and other access points receive an acknowledgement to that effect.

The serving access point can control communication of acknowledgements (e.g., ACK and NAK) of successful decoding of a transmission to terminals. For example, as described above, the serving access point can receive acknowledgements from neighboring access points and then transmit an acknowledgement to the terminal. Alternatively, neighboring access points can provide acknowledgements directly to the terminals. In general, if the neighboring access point is able to receive the reverse link transmission from the terminal, terminal is capable of receiving an acknowledgement from the neighboring access point.

In aspects, assignment information can be sent through backhaul from the serving access point to all access points in the active set (e.g. that have allocated resources to a particular use). In particular, assignment information can be set through the backhaul before the assignment is sent over the air to the terminal. Alternatively, assignment information can be sent through the backhaul at the same time assignment information is sent over the air to terminal. Systems can have varying delays in transmission of messages via backhaul, referred to as backhaul delay. If the backhaul delay is small, such that the assignment information is received at neighboring sectors before the terminal finishes the first transmission, then the neighboring access points can decode the terminal's data at first transmission.

If the backhaul delay is large, the neighboring access points may not be able to start decoding until after additional transmissions have been received. In this case, decoding by neighboring access points can still be valuable if data is provided over multiple transmissions. The received signal can be buffered for multiple frame or packet durations to allow for receipt of assignment information. In particular, the frame duration times the number of buffered frames can be greater than the backhaul delay from all neighboring access points. Based on the backhaul assignment message, the most recent packet is decoded.

In some aspects, this multiple hypothesis decoding may utilized, such that the first hypothesis assumes only one sub-packet has been transmitted; if decoding of the single sub-packet is unsuccessful, it is assumed that two sub-packets have been transmitted, and so on. This process is repeated until successful the transmissions are decoded or until all buffered frames have been used for decoding. If any of the decoding attempts is successful, an acknowledgement (ACK) can be send to the terminal and/or the serving sector. A negative acknowledgement (NAK) need not be transmitted.

Figure 2:
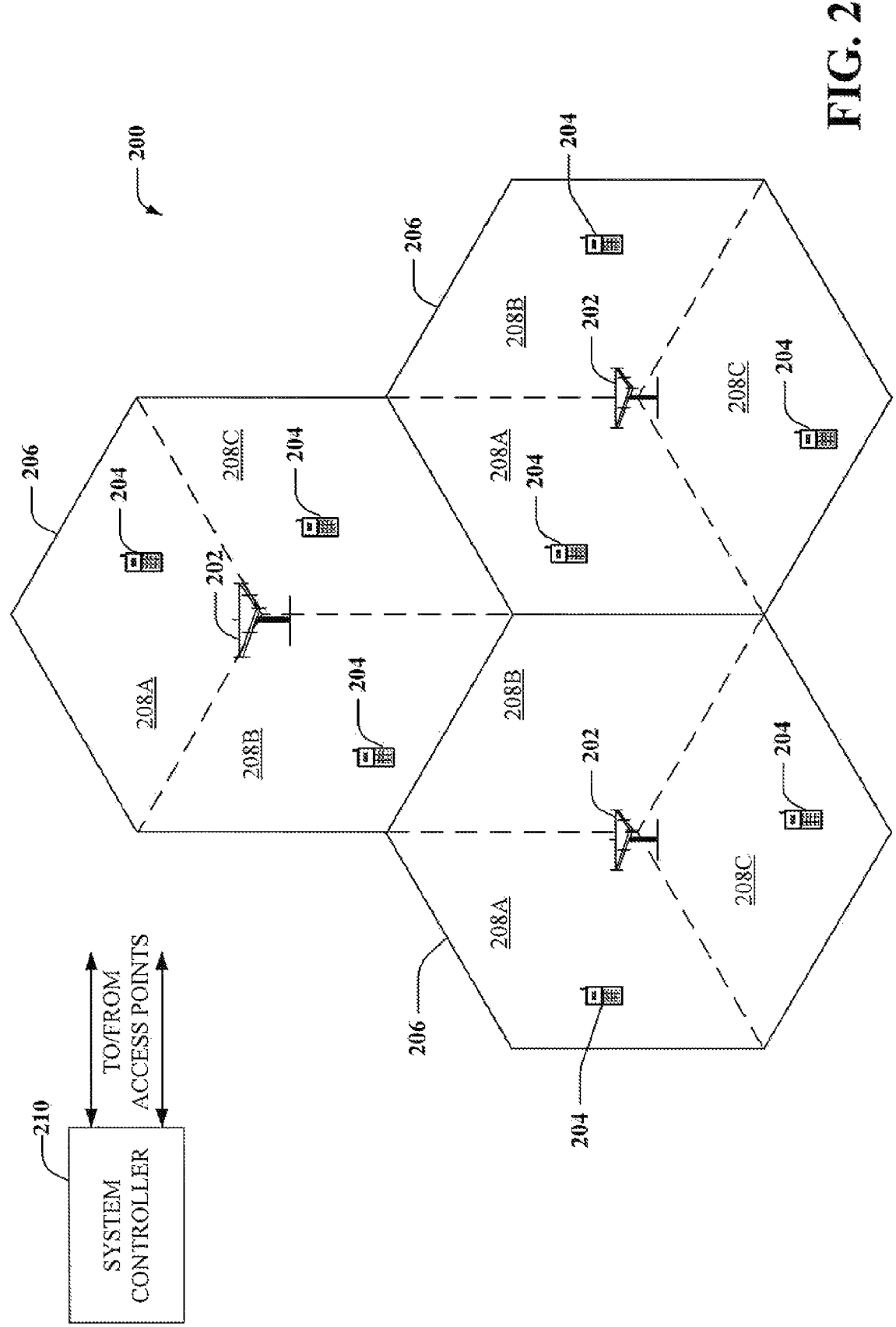
FIG. 2 is an illustration of a wireless communication system in accordance with one or more aspects presented herein.

Referring now to FIG. 2, a wireless communication system 200 in accordance with various aspects presented herein is illustrated. System 200 can comprise one or more access points 202 that receive, transmit, repeat, etc., wireless communication signals to each other and/or to one or more terminals 204. Each access point or base station 202 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 204 can be, for example, cellular phones, smart phones, laptops, handheld communication devices, handheld computing devices, satellite radios, global positioning systems, PDAs, and/or any other suitable device for communicating over wireless system 200. In addition, each terminal 204 can comprise one or more transmitter chains and a receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 2, each access point 202 provides communication coverage for a particular geographic area 206. The term "cell" can refer to an access point and/or its coverage area, depending on context. To improve system capacity, an access point coverage area can be partitioned into multiple smaller areas (e.g., three smaller areas 208A, 208B and 208C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 204 are typically dispersed throughout system 200. Each terminal 204 may be fixed or mobile. Each terminal 204 may communicate with one or more access points 202 on the forward and reverse links at any given moment.

For a centralized architecture, a system controller 210 couples access points 202 and provides coordination and control of access points 202. For a distributed architecture, access points 202 may communicate with one another as needed. Communication between access points via system controller 210 or the like can be referred to as backhaul signaling.

The techniques described herein may be used for a system 200 with sectorized cells as well as a system with un-sectorized cells. For clarity, the following description is for a system with sectorized cells. The term "access point" is used generically for a fixed station that serves a sector as well as fixed station that serves a cell. The terms "terminal" and "user" are used interchangeably, and the terms "sector" and "access point" are also used interchangeably. A serving access point/sector is an access point/sector with which a terminal communicates. A neighbor access point/sector is an access point/sector with which a terminal is not in communication.

Figure 3:
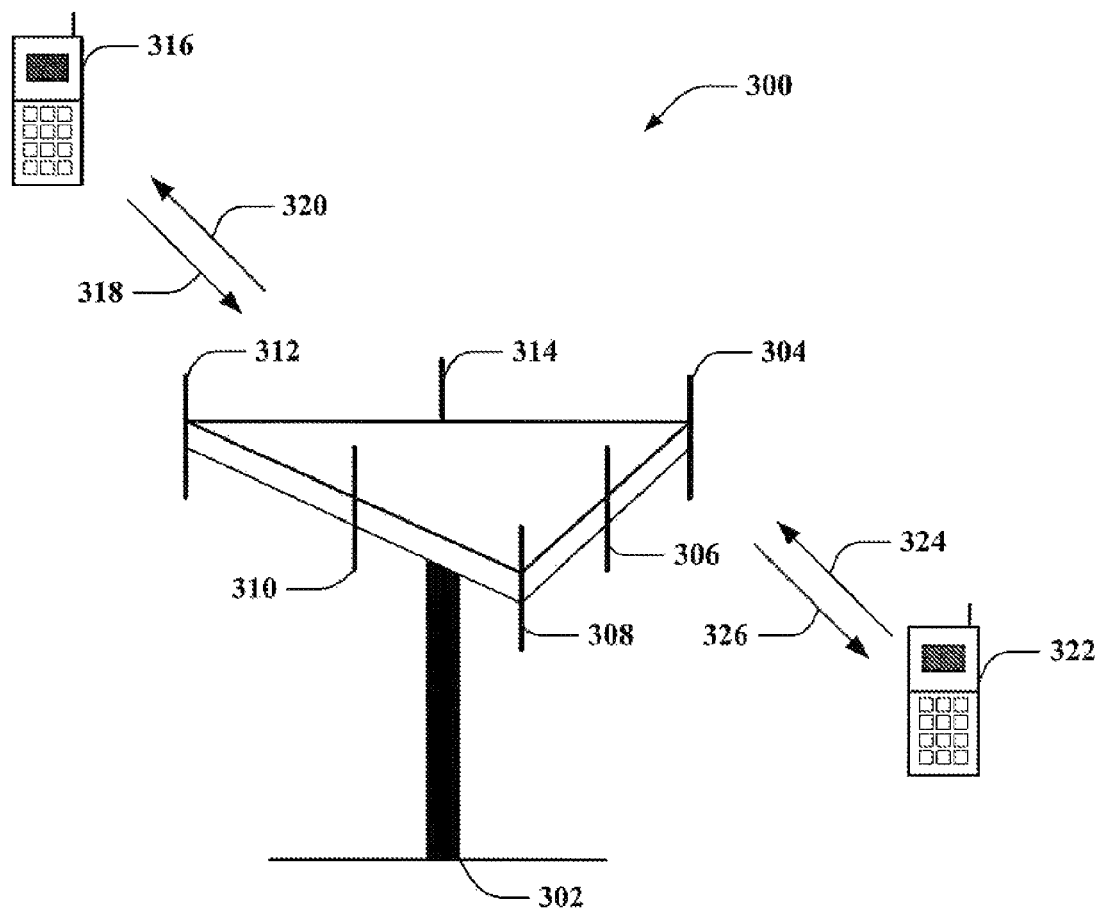
FIG. 3 is an illustration of a wireless communication system in accordance with one or more aspects presented herein.

Referring now to FIG. 3, a multiple access wireless communication system 300 according to one or more aspects is illustrated. A 3-sector access point 302 includes multiple antenna groups, one including antennas 304 and 306, another including antennas 308 and 310, and a third including antennas 312 and 314. According to the figure, only two antennas are shown for each antenna group, however, more or fewer antennas may be utilized for each antenna group. Terminal 316 is in communication with antennas 312 and 314, where antennas 312 and 314 transmit information to terminal 316 over forward link 320 and receive information from terminal 316 over reverse link 318. Terminal 322 is in communication with antennas 304 and 306, where antennas 304 and 306 transmit information to terminal 322 over forward link 326 and receive information from terminal 322 over reverse link 324.

Each group of antennas and/or the are in which they are designated to communicate may be referred to as a sector of access point 302. In one or more aspects, antenna groups each are designed to communicate to terminals in a sector or the areas covered by access point 302. Each access point can provide coverage for a plurality of sectors.

Wireless communication systems can include one or more access points 302 in contact with one or more terminals 316, 322. The coverage areas of the access points can overlap. Consequently, terminals can be located within the coverage area of multiple access points.

Typically, when a terminal is within the coverage area provided by multiple access points, an access point and serving sector is selected based upon the signal strength of the pilot or signal transmission from the access point to the terminal. The signal strength can be measured in terms of the radio frequency (RF) path loss, where the path loss is the power loss that occurs when radio waves move through space along a specific path. In order to determine the path loss, all access points within the network can transmit signals at a predetermined power. The terminal can then measure the power of each of the received signals to determine the access point with the strongest signal strength. Alternatively, the signals can be transmitted at an undetermined power and the transmit power can be encoded in the signal or in another channel. The terminal can then compare the difference between the transmitted and received powers to determine the access point with the strongest signal strength. The terminal can maintain a list or set of access points with relatively strong signal strength, referred to as the active set.

Referring to FIGS. 4-7, methodologies for facilitating reverse link communications to non-serving sectors. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more aspects.

Figure 4:
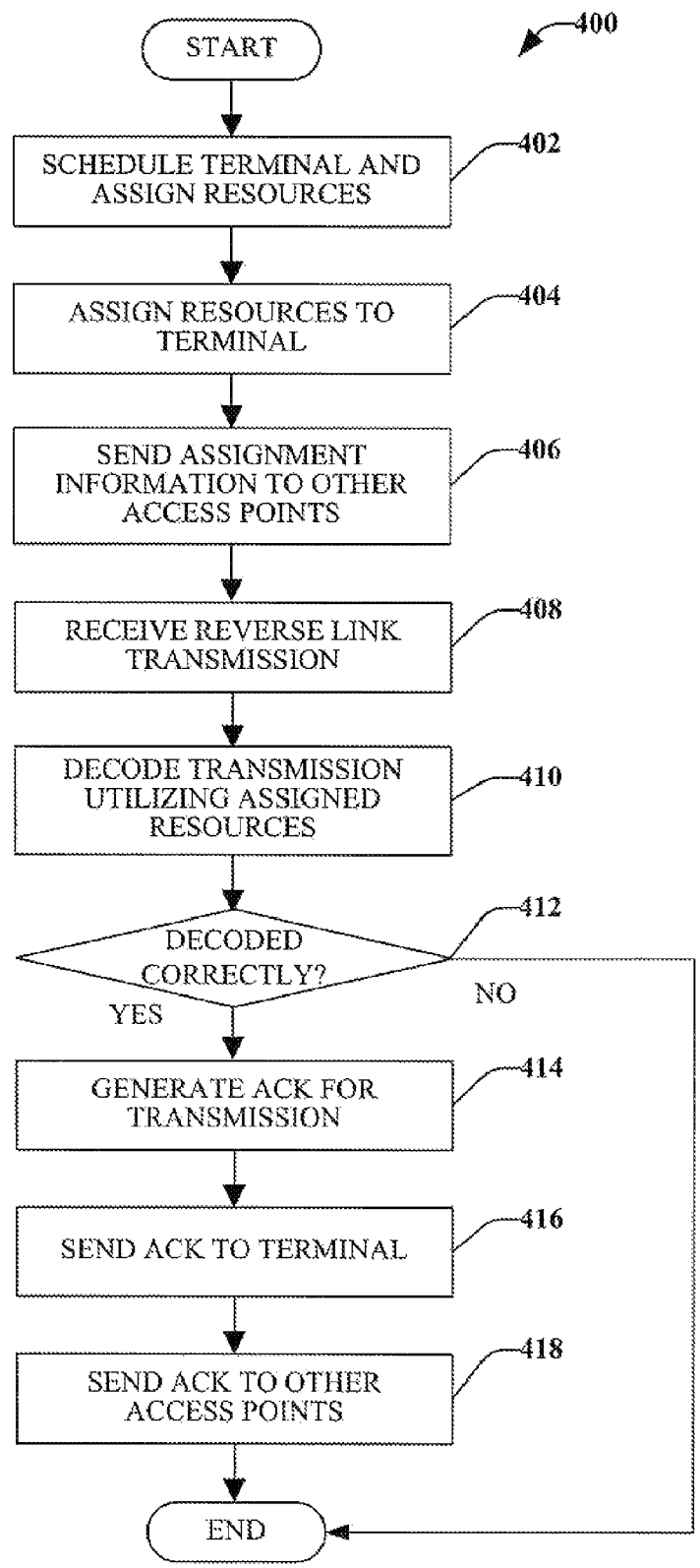
FIG. 4 illustrates a methodology for providing other sectors with assignment information in accordance with one or more aspects presented herein.

Referring now to FIG. 4, a methodology 400 for providing neighboring sectors with assignment information is illustrated. At reference numeral 402, a terminal can be scheduled for transmission on the reverse link and resources can be assigned to the terminal. Resources can include time, frequency and/or a code for TDMA, OFDMA and CDMA system, respectively. At reference numeral 404, assignment information specifying resources allocated to the terminal can be provided to the terminal. The terminal can utilize the assigned resources for reverse link transmissions.

The assignment information can be provided to other access points at reference numeral 406. Assignment information can be provided for selected terminals For example, certain terminals can be identified for soft handoff based upon terminal behavior, such as terminal movement or signal strength. During "soft handoff" a connection is made with a new serving sector prior to breaking the connection with the prior serving sector. Soft handoff typically provides for a smooth transition with minimal disruption of service. Terminals identified for soft handoff can be selected and their assignment information can be provided to other sectors. Assignment information can be sent to other access point via backhaul signaling.

In particular, assignment information can be provided to access points within the active set of the terminal. Terminals can provide active set information to a serving sector. Selected access points, such as access points that are to participate in soft handoff, can be sent assignment information. The assignment information allows non-serving access points to receive and decode information from the terminal. The information is particularly useful for an OFDMA system, where other access points would have to detect the transmission over all possible reverse link channels in the absence of information regarding channel assigned to the terminal.

At reference numeral 408, a reverse link transmission using the assigned resources is received from a terminal. The transmission can be received at a serving sector and/or at other access points. The transmission can be decoded at the serving sector in accordance with the assignment information at 410. The transmissions can also be decoded at neighboring sectors based upon assignment information received from the serving sector. At reference numeral 412, a determination can be made as to whether the transmission was decoded correctly. For example, error checking can be performed to detect errors. If the transmission was not decoded correctly at the serving sector, the process ends. In aspects, a negative acknowledgement (NAK) can be transmitted to the terminal to trigger retransmission.

If the transmission was correctly decoded, an acknowledgement (ACK) can be generated at reference numeral 414. At reference numeral 416, the acknowledgement is transmitted to the terminal. Once the acknowledgement is received, the terminal can generate additional reverse link transmissions. At reference numeral 418, an acknowledgement is transmitted to other access points within the active set. The acknowledgement can be transmitted via backhaul signaling. The other access points can terminate processing of the transmission upon receipt of the acknowledgement.

Figure 5:
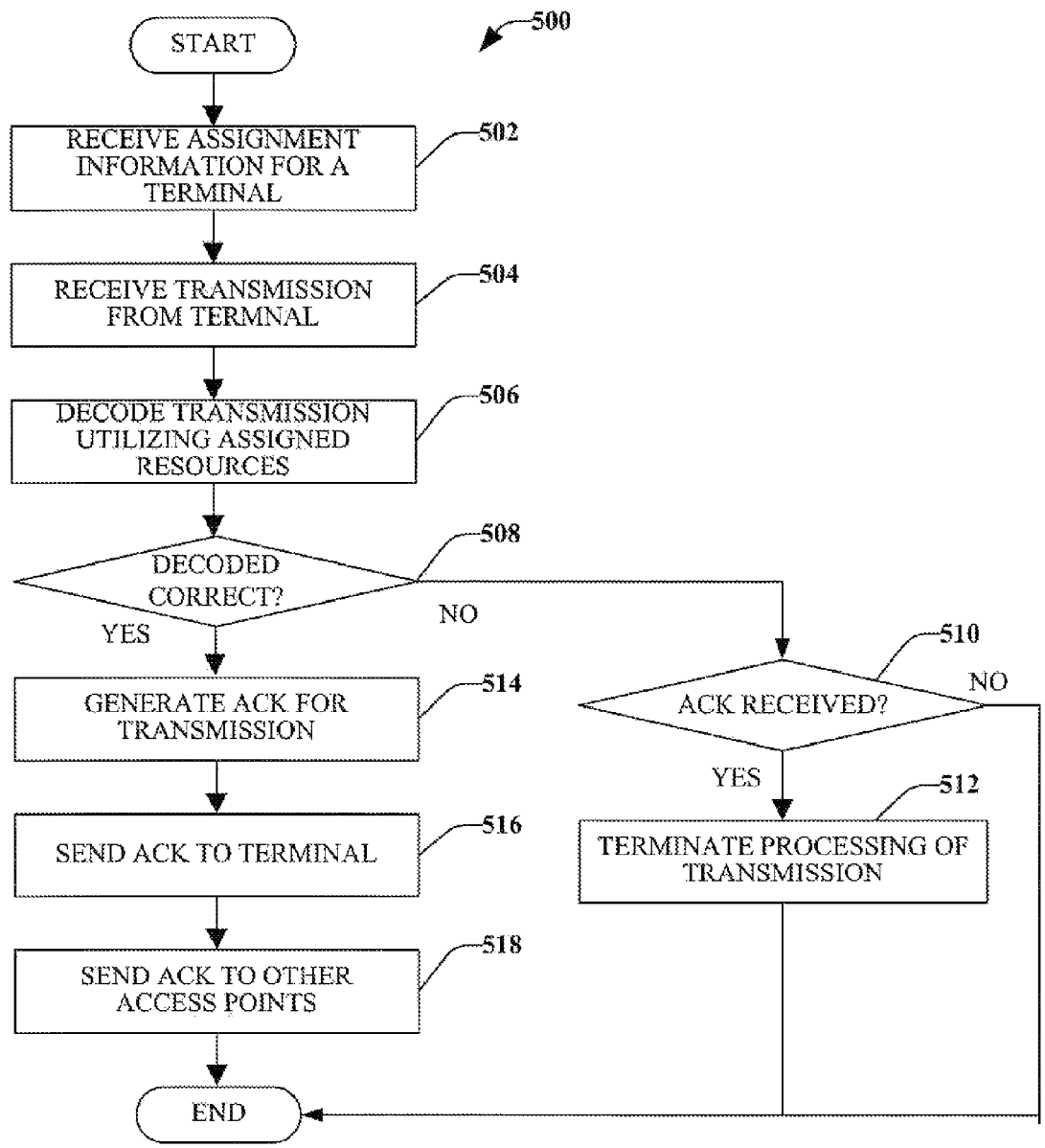
FIG. 5 illustrates a methodology for processing reverse link communications at a non-serving sector of a terminal in accordance with one or more aspects presented herein.

Turning now to FIG. 5, a methodology 500 for processing reverse link communications at a non-serving sector is illustrated. At reference numeral 502, a non-serving sector can receive assignment information for a terminal. The information can be received over a dedicated channel (e.g., RRI). Alternatively, the assignment information can be received via backhaul signaling. The non-serving sector can receive assignment information for terminals that includes the non-serving sector within their active set and/or terminals that have been identified for soft-handoff.

At reference numeral 504, a sector can receive a reverse link transmission from a terminal that is not supported by the sector. The sector can utilize the assignment information (e.g., frequency) to detect the transmission. For example, in an OFDMA system, each terminal can be assigned a subcarrier. Information regarding subcarrier assignments can be included within the assignment information provided to the non-serving sector. Consequently, the non-serving sector can monitor the assigned subcarrier for transmissions from the terminal.

The sector can utilize assignment information to decode a received transmission at reference numeral 506. At reference numeral 508, a determination is made as to whether the transmission was correctly decoded. If no, at reference numeral 510 it is determined whether an acknowledgment has been received indicating that the transmission was decoded at another sector. If an acknowledgment was received, the sector can terminate processing at reference numeral 512. If no acknowledgement is received, there as been an error in decoding and the process terminates.

If the transmission has been correctly decoded at the non-serving sector, an acknowledgement can be generated at reference numeral 514. At reference numeral 516, the acknowledgement can be transmitted to the terminal. Upon receipt of the acknowledgement, the terminal can continue transmit additional packets. At reference numeral 518, an acknowledgement can be sent to other access points notifying them of successful decoding of the transmission. The acknowledgement can be sent over the air or via backhaul signaling. Other access points can include the serving sector as well as any sectors within the active set of the terminal.

Acknowledgement of successful decoding of the transmission can be provided directly to the terminal or through the serving sector. Since the non-serving sector was able to receive the transmission, it is likely that the non-serving sector can successfully transmit an acknowledgement to the terminal. Alternatively, the non-serving sector can send an acknowledgement to the serving sector, which in turn can send an acknowledgement or notification to the terminal.

Figure 6:
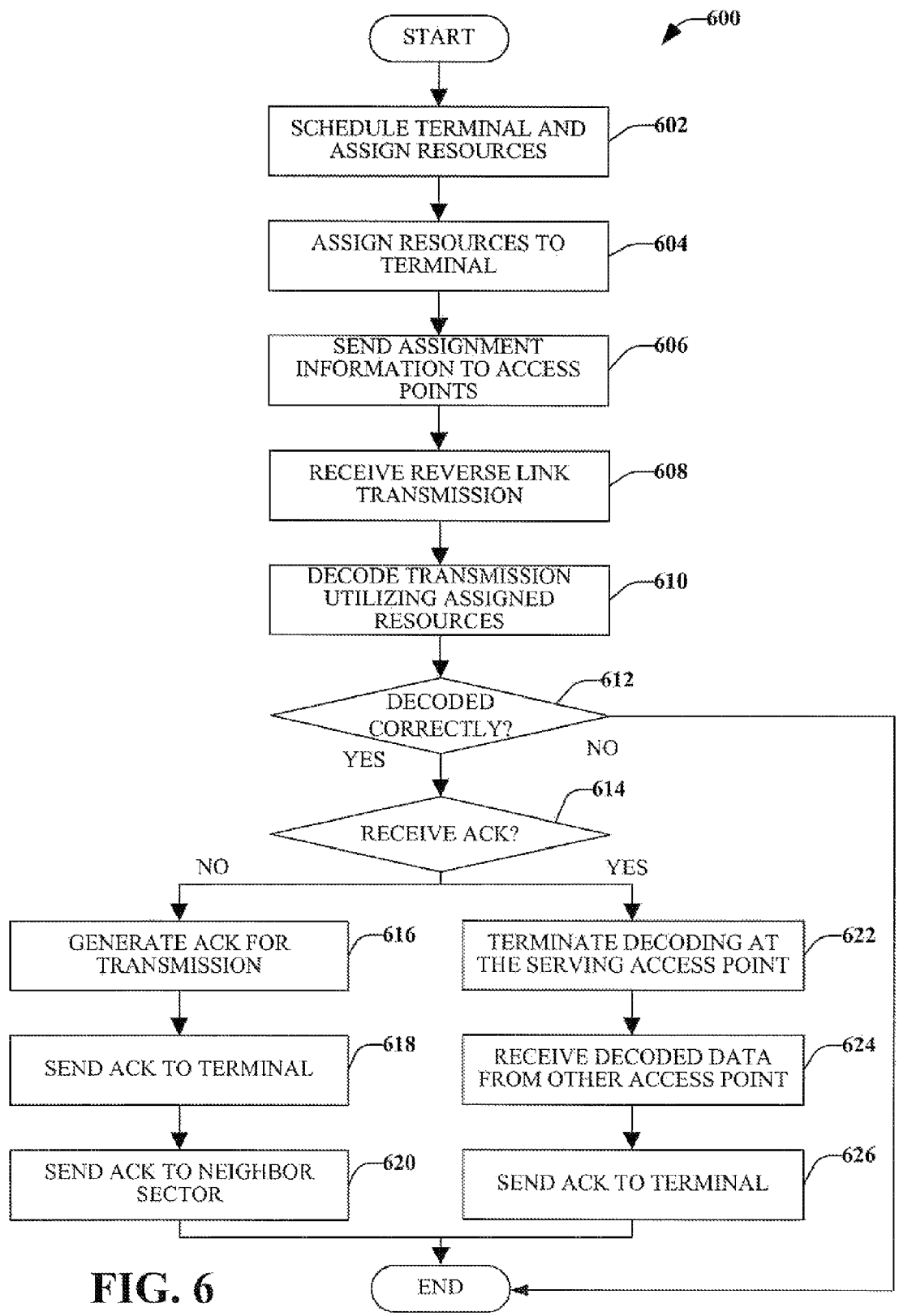
FIG. 6 illustrates a methodology for coordinating receipt of reverse link transmissions among serving and non-serving sectors in accordance with one or more aspects presented herein.

FIG. 6 illustrates a methodology 600 for coordinating receipt of reverse link transmissions among serving and non-serving sectors. At reference numeral 602, a terminal can be scheduled for transmission on the reverse link and resources can be assigned to the terminal. Resources can include time, frequency and/or a code. At reference numeral 604, assignment information specifying resource allocated to the terminal can be provided to the terminal. The terminal can utilize the assigned resources for reverse link transmissions.

The assignment information for selected terminals can also be provided to other access points at reference numeral 606. In particular, assignment information can be provided to access points within the active set of the selected terminal or access points that are to participate in soft handoff for the terminal. The assignment information allows non-serving access points to decode information from the terminal. As discussed above, assignment information can be particularly important in an OFDMA system, where assignment information can include subcarrier information used to detect transmissions.

At reference numeral 608, a reverse link transmission using the assigned resources is received from a terminal. The transmission can be received at a serving sector and/or at other access points. The transmission can be decoded at the serving sector in accordance with the assignment information at 610. The transmissions can also be decoded at neighboring sectors. At reference numeral 612, a determination can be made as to whether the transmission was decoded correctly, either at the serving sector or at one of the neighboring sectors. If the transmission was not decoded correctly at the serving sector or the neighboring sectors, the process ends. A negative acknowledgement can be sent to the terminal and the transmission from the terminal can be resent.

If the transmission was correctly decoded, a determination can be made as to whether an acknowledgement was received from a neighboring sector at 614. If no, the transmission was decoded by the serving sector and an acknowledgement can be generated at reference numeral 616. At reference numeral 618, an acknowledgement is transmitted to the terminal. Once the acknowledgement is received, the terminal can generate additional reverse link transmissions. At reference numeral 620, an acknowledgement is transmitted to other access points. The acknowledgement can be transmitted via backhaul signaling or over the air. Other access points can terminate processing of the transmission upon receipt of the acknowledgement.

If the transmission was decoded by another sector, the serving sector can terminate decoding of the transmission at reference numeral 622. At reference numeral, 624, in some aspects, the serving sector can obtain decoded data along with the acknowledgement. Additionally, the serving sector can send an acknowledgement to the terminal at reference numeral 626. Alternatively, the sector that decoded the transmission can send an acknowledgement to the terminal.

Figure 7:
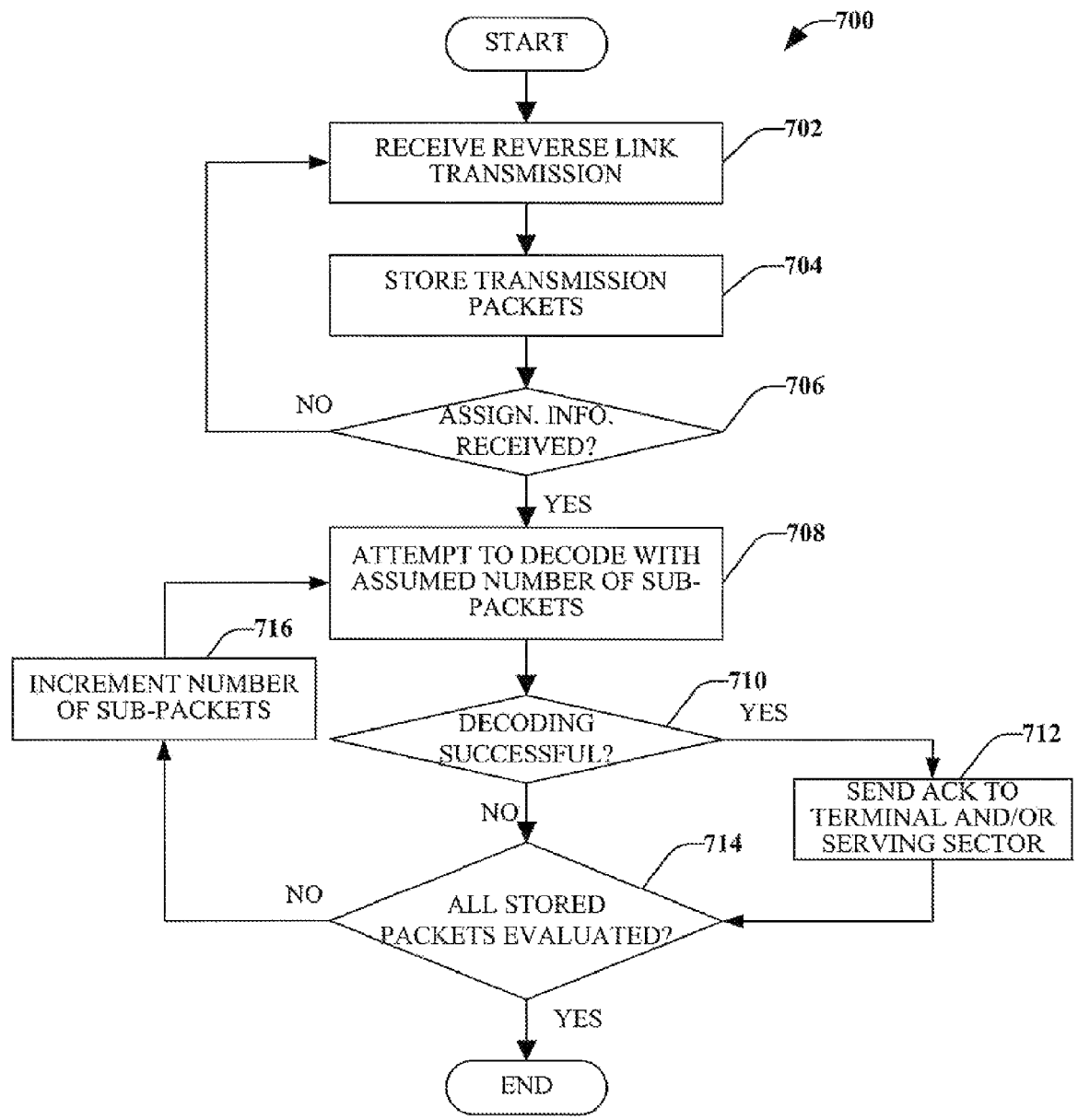
FIG. 7 illustrates a methodology for processing reverse link communications at a non-serving sector of a terminal in accordance with one or more aspects presented herein.

Referring now to FIG. 7, a methodology 700 for processing reverse link communications at a non-serving sector and compensating for backhaul delay is illustrated. At reference numeral 702, a sector can receive a reverse link transmission from a terminal not supported by the sector. The transmission data packets can be stored or maintained by the non-serving sector at reference numeral 704. At reference numeral 706, a determination is made as to whether the sector has received assignment information for the terminal that would allow the non-serving sector to decode the transmission. Assignment information can be received after the terminal has sent one or more reverse link transmissions due to backhaul signaling delay. If the assignment information has not yet been received, the process can return to reference numeral 702, where additional transmission can be received.

If assignment information has been received, the non-serving sector can attempt to decode transmission based upon the assignment information at reference numeral 708. The sector can assume that only one sub-packet has been transmitted. At reference numeral 710, a determination can be made as to whether decoding was successful. If yes, an acknowledgement can be transmitted to the terminal and/or the serving sector at reference numeral 712, and the process terminates. If no, at 714, a determination can be made as to whether all buffered data from the terminal has been evaluated. If yes, the transmission cannot be decoded and the process terminates. If no, not all the data has been utilized. At reference numeral 716, the number of sub-packets can be incremented and the process returns to reference numeral 708, where an attempt is made to decode using the incremented number of sub-packets. For example, the second attempt can assume that two sub-packets have been transmitted.

Figure 8:
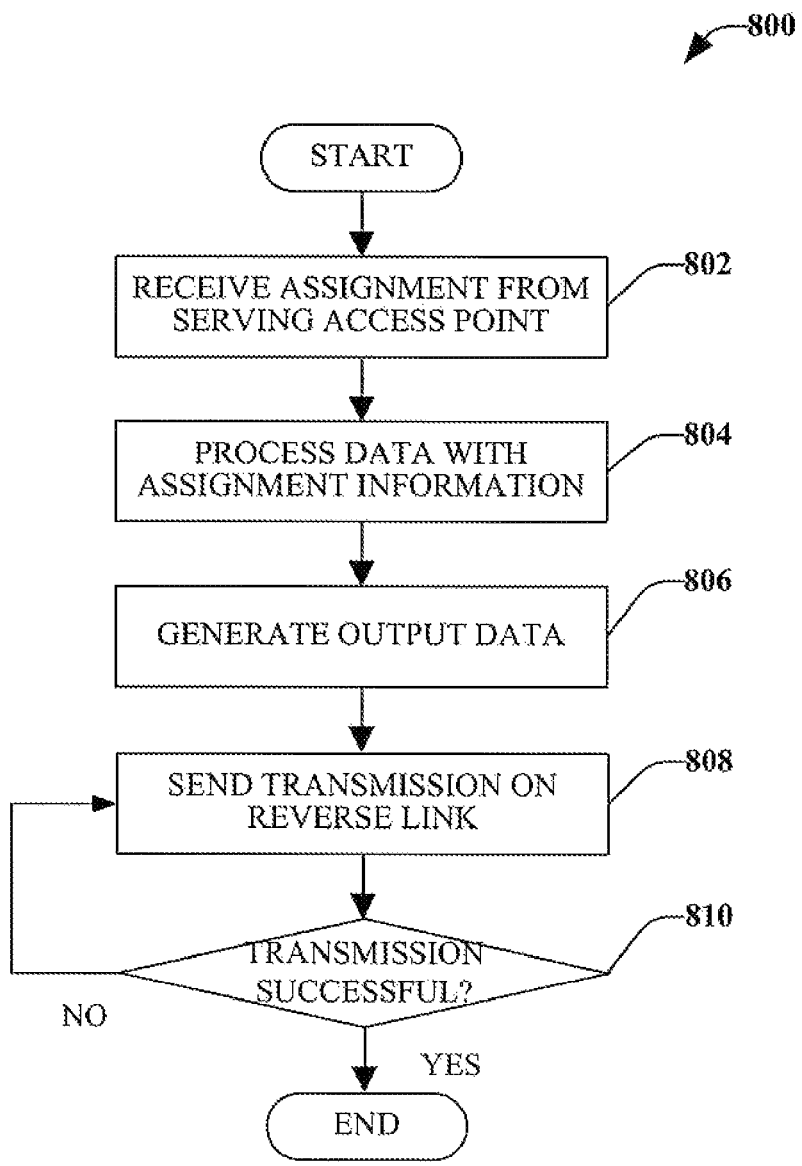
FIG. 8 illustrates a methodology for providing other sector communication in accordance with one or more aspects presented herein.

Turning now to FIG. 8, a methodology 800 for other sector communication is illustrated. At reference numeral 802, a terminal receives assignment information from a serving access point. The assignment information can be used by the terminal for reverse link transmissions. The terminal can process (e.g., encode and symbol map) input data in accordance with at least one communication parameter within the assignment information to generate output data at reference numeral 804. The output data can be used to generate a transmission using the parameter(s) sent on a set of subbands indicated in the assignment information at reference numeral 806. At reference numeral 808, the transmission can be sent via the reverse link. The transmission can be received by the serving sector as well as additional proximate sectors, such as sectors within the active set of the terminal.

After transmission, the terminal can wait for an acknowledgement of successful receipt and decoding of the transmission. At reference numeral 810, a determination can be made as to whether the transmission was successful. Success may be determined based upon receipt of an acknowledgement (ACK) from the serving sector or a neighboring sector. If the transmission was successful, the terminal can continue with additional transmissions. If no acknowledgement is received, the terminal can assume that transmission was not successful based upon lack of acknowledgement within a predetermined time period. Alternatively, terminal can receive a negative acknowledgement (NAK) indicating failure to receive and decode the transmission at the serving sector. If the transmission was not successfully received and decoded, the terminal can resend the transmission at reference numeral 808.

Figure 9:
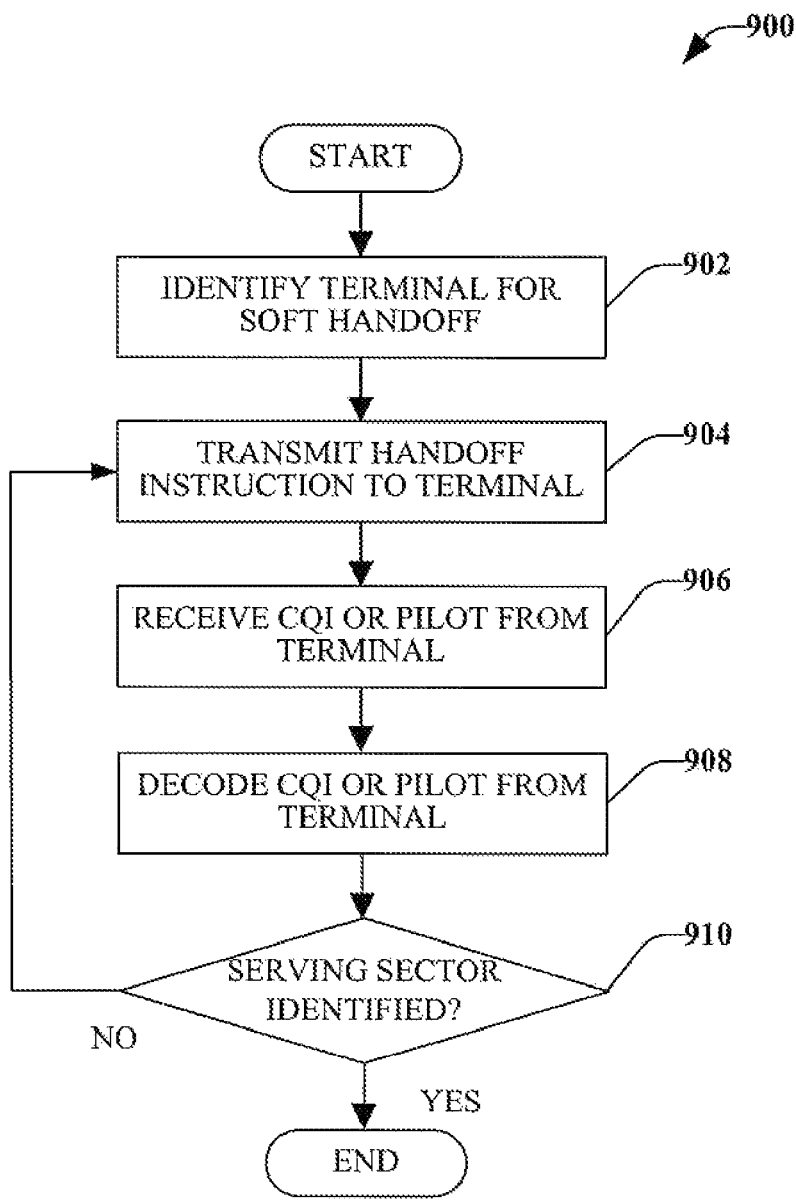
FIG. 9 illustrates a methodology for facilitating soft handoff of a terminal in accordance with one or more aspects presented herein.

Turning now to FIG. 9, a methodology 900 for providing for handoff is illustrated. Handoff can be facilitated since the sector that will support the terminal has likely already received and possibly decoded transmissions from the terminal. Consequently, the possibility of interruption of service is minimized. At reference numeral 902, one or more terminals can be identified for soft handoff. For instance, a serving sector can determine that a terminal supported by the serving sector is transitioning into another sector. The serving sector can transmit an instruction to the terminal directing handoff to a neighbor sector at reference numeral 904. The neighbor sector can be one of the sectors within the active set maintained by the terminal. Such neighbor sector would already have assignment information for the terminal and would be able to receive and decode one or more transmissions while the terminal is still supported by the serving sector.

At reference numeral 906, the serving sector can receive channel quality indicator(s) (CQI) and/or pilot transmissions from the access terminal. The serving sector can decode the CQI and/or pilot transmissions at reference numeral 908. At reference numeral 910, a determination can be made as to whether the new serving sector is properly identified. If yes, the process terminates with handoff of the terminal. If no, the process can return to reference numeral 904 and the original serving sector can provide another handoff instruction to the terminal.

It will be appreciated that inferences can be made regarding transmission power, formats, frequencies, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding identifying terminals for soft handoff. Inferences can also be made identifying neighboring access points and the like.

Figure 10:
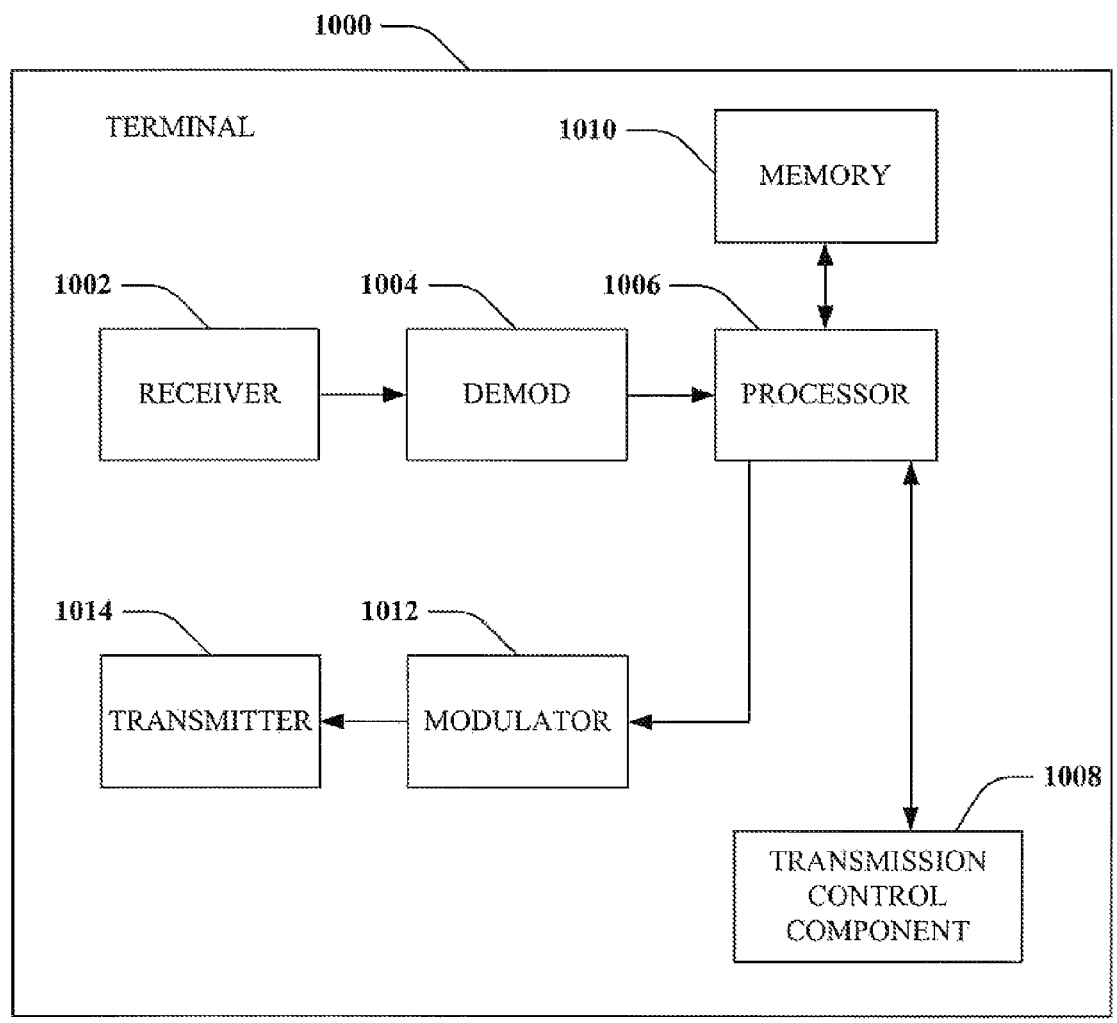
FIG. 10 illustrates a system that provides for other sector communication in accordance with one or more aspects presented herein.

FIG. 10 is an illustration of a terminal or user device 1000 that provides for other sector communication in a wireless communication environment in accordance with one or more aspects set forth herein. Terminal 1000 comprises a receiver 1002 that receives a signal, for instance one or more receive antennas, and performs typical actions (e.g., filters, amplifies, downconverts, etc.) the received signal and digitizes the conditioned signal to obtain samples. A demodulator 1004 can demodulate the samples and provide received pilot symbols to a processor 1006.

Processor 1006 can be a processor dedicated to analyzing information received by receiver component 1002 and/or generating information for transmission by a transmitter 1014. Processor 1006 can be a processor that controls one or more components of terminal 1000, and/or a processor that analyzes information received by receiver 1002, generates information for tansmission by a transmitter 1014, and controls one or more components of terminal 1000. Processor 1006 can utilize any of the methodologies described herein, including those described with respect to FIGS. 4-9.

In addition, terminal 1000 can include a transmission control component 1008 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 1008 can be incorporated into the processor 1006. It is to be appreciated that transmission control component 1008 can include transmission control code that performs analysis in connection with determining receipt of acknowledge.

Terminal 1000 can additionally comprise memory 1010 that is operatively coupled to processor 1006 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct RAmbus RAM (DRAM). The memory 1010 of the subject systems and methods is intended to comprise, without being limited to, these and any other suitable types of memory. Processor 1006 is connected to a symbol modulator 1012 and transmitter 1014 that transmits the modulated signal.

Figure 11:
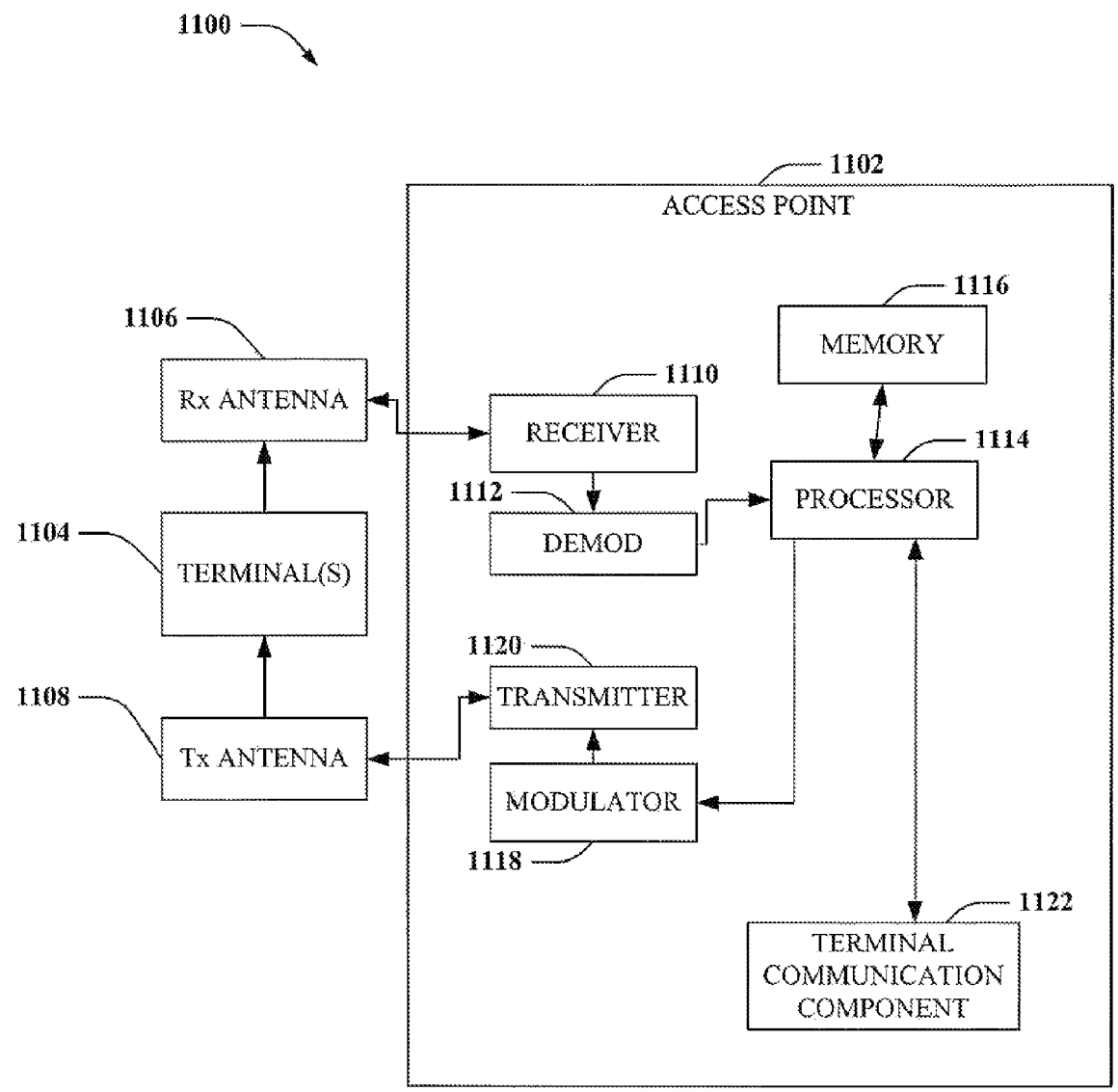
FIG. 11 illustrates a system that provides for processing reverse link communications at a non-serving sector of a terminal in accordance with one or more aspects presented herein.

FIG. 11 is an illustration of a system 1100 that facilitates other sector communication in a communication environment in accordance with various aspects. System 1100 comprises an access point 1102 with a receiver 1110 that receives signal(s) from one or more terminals 1104 through one or more receive antennas 1106, and transmits to the one or more terminals 1104 through a plurality of transmit antennas 1108. Terminals 1104 can include those terminals supported by the access point 1102, as well as terminals 1104 supported by neighboring sectors. In one or more aspects, receive antennas 1106 and transmit antennas 1108 can be implemented using a single set of antennas. Receiver 1110 can receive information from receive antennas 1106 and is operatively associated with a demodulator 1112 that demodulates received information. Receiver 1110 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1114 that is similar to the processor described above with regard to FIG. 10, and is coupled to a memory 1116 that stores information related to terminals, assigned resources associated with terminals and the like. Receiver output for each antenna can be jointly processes by receiver 1110 and/or processor 1114. A modulator 1118 can multiplex the signal for transmission by a transmitter 1120 through transmit antennas 1108 to terminals 1104.

Access point 1102 further comprises a terminal communication component 1122, which can be a processor distinct from, or integral to, processor 1114. Terminal communication component 1122 can obtain resource assignment information for terminals supported by neighboring sectors. In addition, terminal communication component 1122 can provide assignment information to neighboring sectors for terminals supported by access point 1102. Assignment information can be provided via backhaul signaling.

Based upon information regarding assigned resources, terminal communication component 1122 can direct detection of transmissions from terminals supported by neighboring sectors, as well as decoding of received transmissions. Memory 1116 can maintain packets received from terminals prior to receipt of the assignment information necessary for decoding of packets. Terminal communication component 1122 can also control transmission and receipt of acknowledgments indicating successful reception and decoding of transmissions. It is to be appreciated that terminal communication component 1122 can include transmission analysis code that performs utility based control in connection with assigning resources, identifying terminals for soft handoff, decoding transmissions and the like. The terminal analysis code can utilize artificial intelligence based methods in connection with performing inference and/or probabilistic determinations and/or statistical-based determinations in connection with optimizing terminal performance.

Figure 12:
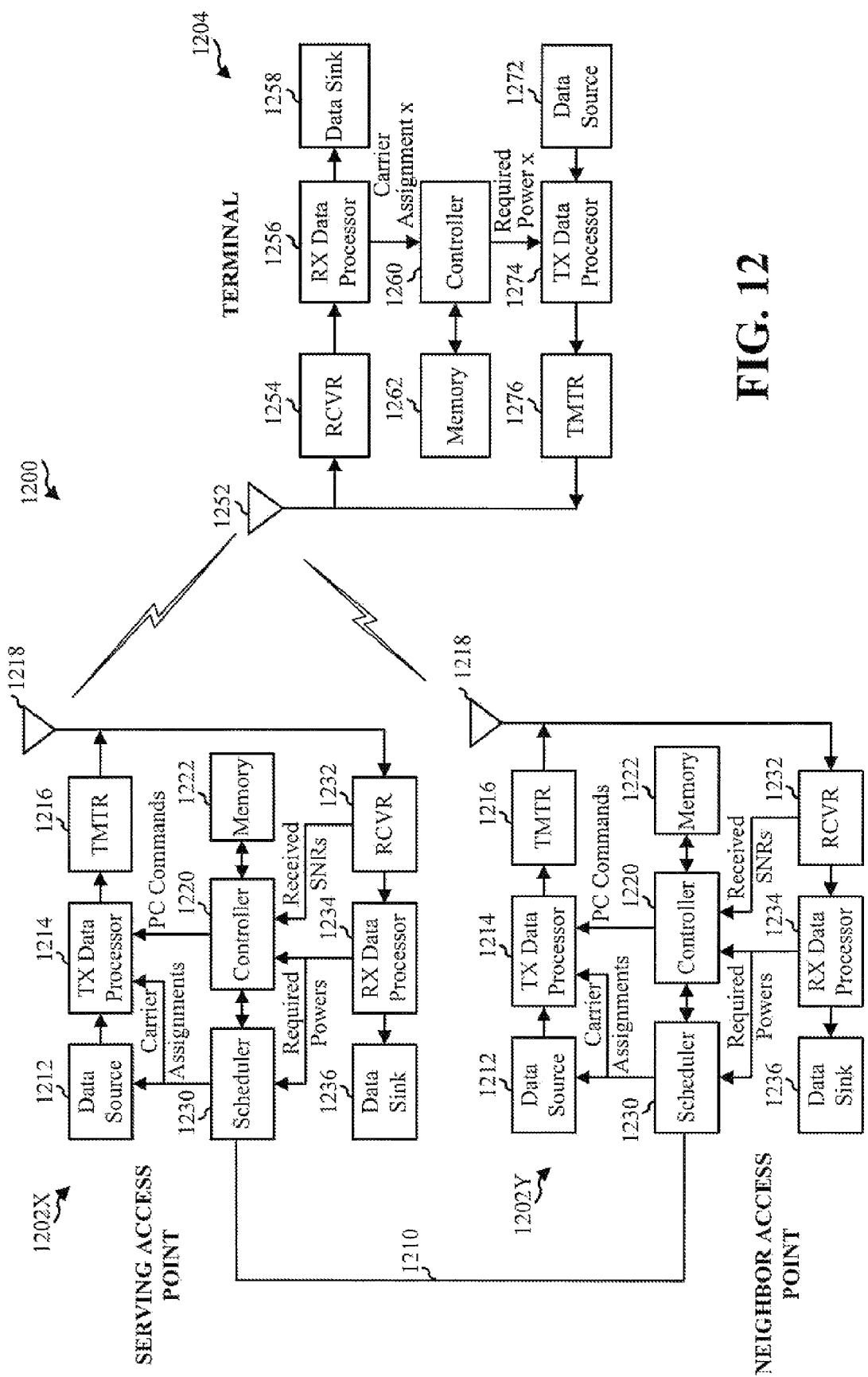
FIG. 12 is an illustration of a wireless communication environment that can be employed in conjunction with the various systems and methods described herein.

FIG. 12 shows an exemplary wireless communication system 1200. The wireless communication system 1000 depicts one terminal and two access points for sake of brevity. However, it is to be appreciated that the system can include one or more access point and/or more than one terminal, wherein additional access points and/or terminals can be substantially similar or different from the exemplary access points and terminal described below. In addition, it is to be appreciated that the access points and/or the terminal can employ the systems (FIGS. 1-3, 10 and 11) and/or methods (FIGS. 4-9) described herein.

FIG. 12 shows a block diagram of a terminal 1204, a serving access point 1202X point that supports terminal 1024 and a neighbor access point 1202Y in multiple-access multi-carrier communication system 1200. At access point 1202X, a transmit (TX) data processor 1214 receives traffic data (i.e., information bits) from a data source 1212 and signaling and other information from a controller 1220 and a scheduler 1230. For example, scheduler 1230 may provide assignments of carriers for the terminals. Additionally, a memory 1222 can maintain information regarding current or previous assignments. TX data processor 1214 encodes and modulates the received data using multi-carrier modulation (e.g., OFDM) to provide modulated data (e.g., OFDM symbols). A transmitter unit (TMTR) 1216 then processes the modulated data to generate a downlink modulated signal that is then transmitted from an antenna 1218.

Prior to transmission of assignment information to terminal 1204, scheduler can provide assignment information to access point 1202Y. The assignment information can be provided via backhaul signaling (e.g., a T1 line) 1210. Alternatively, assignment information can be provided to access point 1202Y after transmission to terminal 1204.

At terminal 1204, the transmitted and modulated signal is received by an antenna 1252 and provided to a receiver unit (RCVR) 1254. Receiver unit 1254 processes and digitizes the received signal to provide samples. A received (RX) data processor 1256 then demodulates and decodes the samples to provide decoded data, which may include recovered traffic data, messages, signaling, and so on. The traffic data may be provided to a data sink 1258, and the carrier assignment information for the terminal 1204 is provided to a controller 1260.

Controller 1260 directs data transmission on the uplink using the specific carriers that have been assigned to terminal 1204 and indicated in the received carrier assignment. A memory 1262 can maintain information regarding assigned resources (e.g., frequency, time and/or code) and other related information.

For terminal 1204, a TX data processor 1274 receives traffic data from a data source 1272 and signaling and other information from controller 1260. The various types of data are coded and modulated by TX data processor 1274 using the assigned carriers and further processed by a transmitter unit 1276 to generate an uplink modulated signal that is then transmitted from antenna 1252.

At access points 1202X and 1202Y, the transmitted and modulated signals from terminal 1204 are received by antenna 1218, processed by a receiver unit 1232, and demodulated and decoded by an RX data processor 1234. Transmitted signals can be decoded based upon assignment information generated by serving access point 1202X and provided to neighbor access point 1202Y. In addition, access points 1202X and 1202Y can generate an acknowledgement (ACK) that can be provided to the other access point (1202X or 1202Y) and/or to terminal 1204. The decoded signals can be provided to a data sink 1236. Receiver unit 1232 may estimate the received signal quality (e.g., the received signal-to-noise ratio (SNR)) for each terminal and provide this information to controller 1220. RX data processor 1234 provides the recovered feedback information for each terminal to controller 1220 and scheduler 1230.

Scheduler 1230 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 1220 and 1260, TX and RX processors 1214 and 1234, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 13:
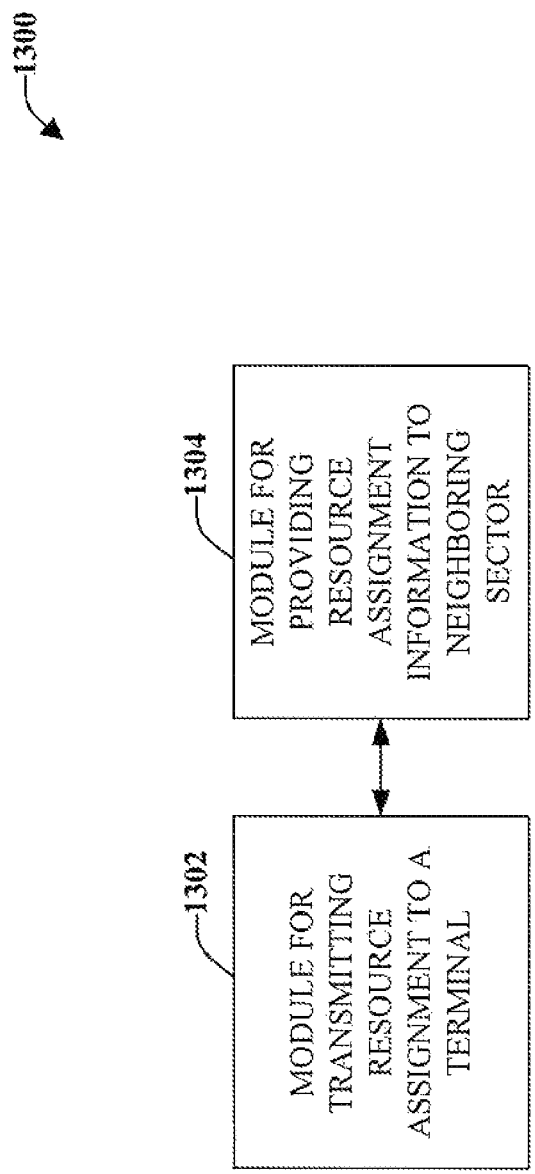
FIG. 13 is a block diagram of a system that facilitates other sector communication in accordance with one or more aspects presented herein.

Referring now to FIG. 13, a system 1300 that facilitates other sector communication is illustrated. System 1300 can include a module 1302 for transmitting resource assignment to a terminal. System 1300 can utilize orthogonal frequency division multiplexing to support multiple terminals. In particular, the resource assignment can allocate a channel to a particular terminal, which will utilize the allocated channel for reverse link transactions.

System 1300 can also include a module 1304 for providing resource assignment information (e.g. the channel allocated to the terminal) to a neighboring sector. The neighboring sector can utilize the resource assignment information to detect, receive and decode reverse link transmission from the terminal. Processing of reverse link transmissions by neighboring sectors facilitates soft handoff of the terminal and allows for load balancing.

Figure 14:
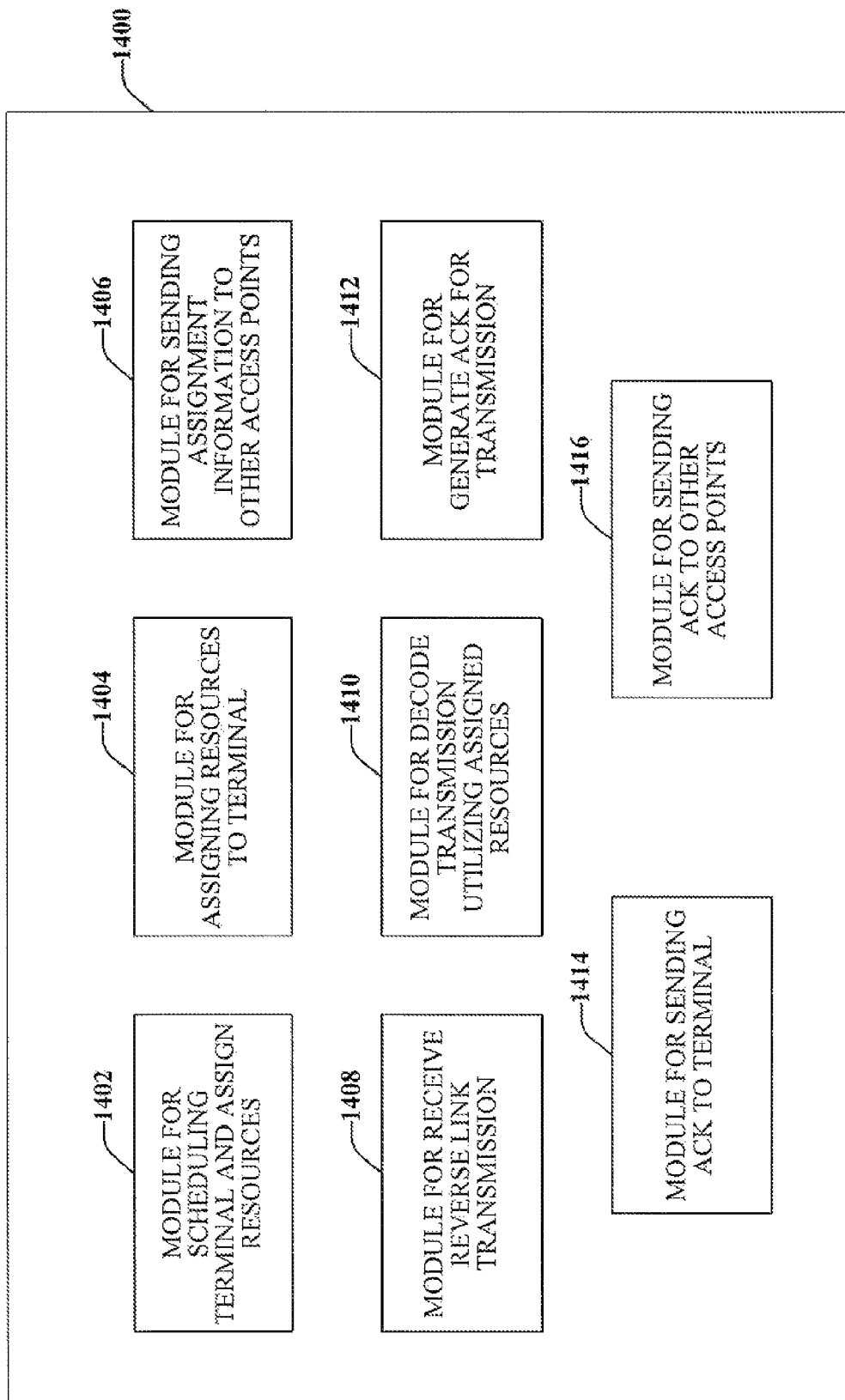
FIG. 14 is a more detailed block diagram of a system that facilitates other sector communication in accordance with one or more aspects presented herein.

Turning now to FIG. 14, a more detailed block diagram of a system 1400 that facilities other sector communication is illustrated. System 1400 can include a module 1402 for scheduling terminal(s) and assigning resources. Module 1402 can be responsible for managing channels or subcarriers assigned to terminals within a sector. Module 1404 can transmit an assignment signal to terminals, allocating resources. System 1400 can also include a module 1406 for sending the assignment information to other access points. In particular, assignment information can be provided to access points that are included within the active set of the terminal.

System 1400 can include a module 1408 for receiving a reverse link transmission from the terminal and a module 1410 for decoding the reverse link transmission based upon the assigned resources for the terminal. A module 1412 for generating an acknowledgement signal (ACK) can create an ACK when the reverse link transmission is successfully decoded. System 1400 can include a module 1414 for sending the ACK to the terminal as well as module 1416 for sending an ACK to other access points that may be processing the reverse link transmission.

Figure 15:
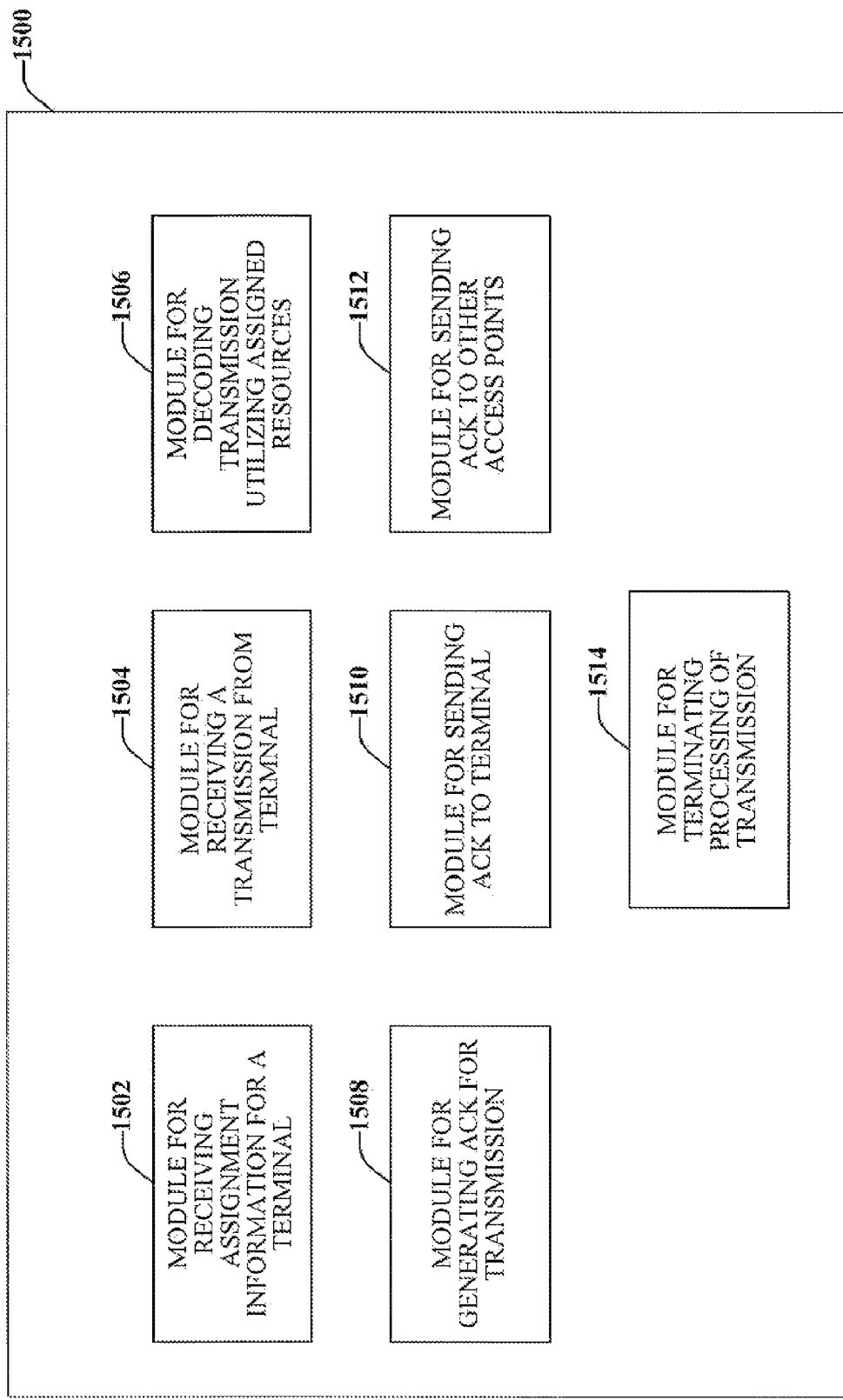
FIG. 15 is a block diagram of a system that facilitates other sector communication in accordance with one or more aspects presented herein.

Referring now to FIG. 15, a block diagram of a system 1500 that facilitates other sector communication is illustrated. System 1500 can include a module 1502 for receiving assignment information for a terminal supported by a neighboring sector and a module 1504 for receiving a reverse link transmission from the terminal. A module 1506 can decode the reverse link transmission based upon the received assignment information.

System 1500 can be capable of coordinating transmission processing with the neighboring sector. Accordingly, system 1500 can include a module 1508 for generating an acknowledgee (ACK) indicating successful decoding of the transmission, a module 1510 for sending the ACK to the terminal and a module 1512 for sending the ACK to the neighboring sector and any other access points that may be processing the transmission. In addition, system 1500 can receive an ACK from another access point indicating successful decoding. Accordingly, system 1500 can include a module 1514 for terminating processing of the transmission upon receipt of an ACK.

Figure 16:
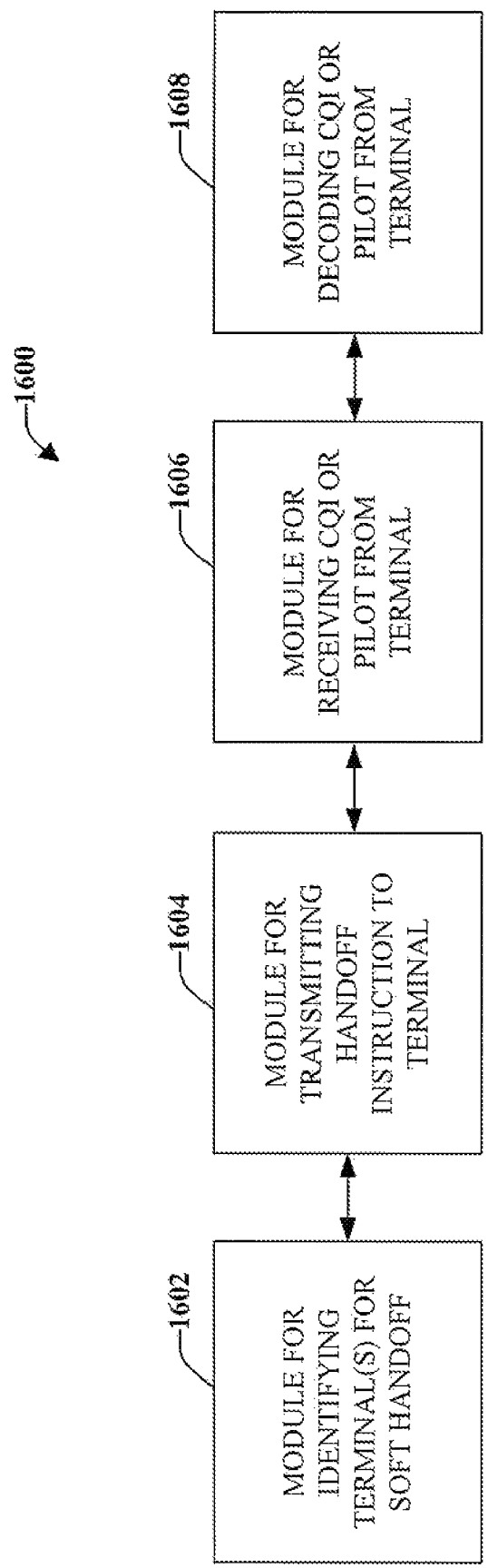
FIG. 16 is a block diagram of a system facilitates soft handoff of a terminal in accordance with one or more aspects presented herein.

Turning now to FIG. 16, a system 1600 that facilitates soft handoff of a terminal is illustrated. System 1600 can include a module 1602 for identifying one or more terminals for handoff and a module 1604 for transmitting a handoff instruction to the identified terminal or terminals. Terminals can be identified based upon signal, location of the terminal or any other factors.

System 1600 can include a module 1606 for receiving a channel quality indicator (CQI) or pilot signal from the terminal. In addition, system 1600 can include a module 1608 for decoding CQI or pilots received from a terminal and determining if the terminal has identified the new serving sector. If the serving sector is not correctly identified th handoff instruction can be retransmitted.

Figure 17:
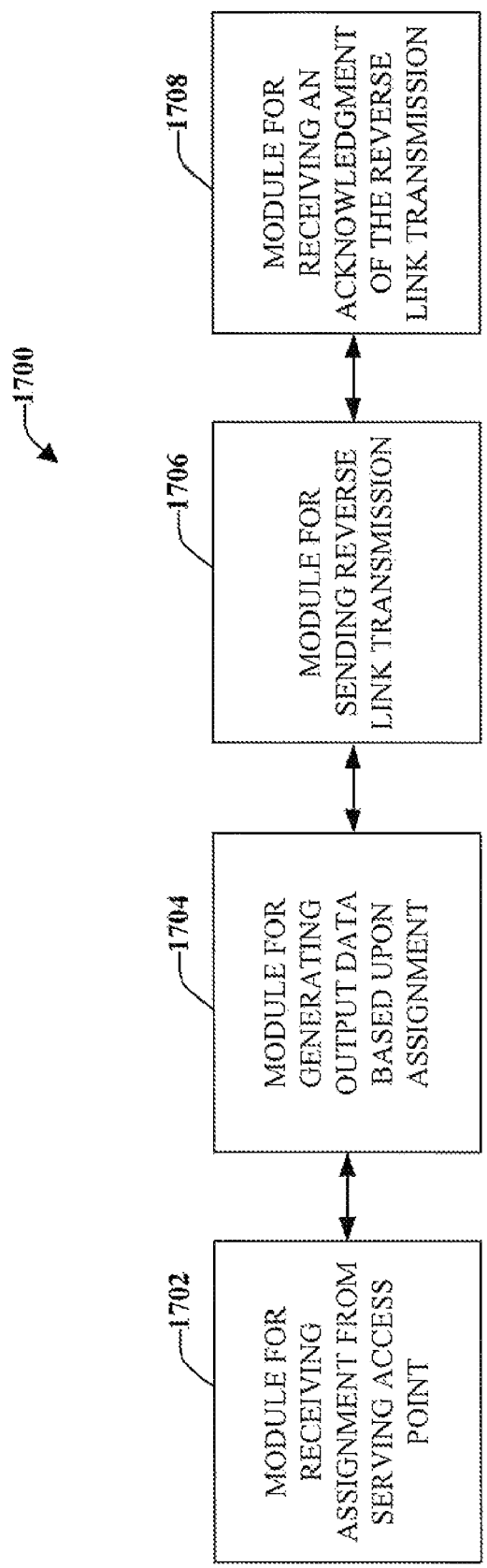
FIG. 17 is a block diagram of a system that facilitates other sector communication in accordance with one or more aspects presented hereon.

Referring now to FIG. 17, a system 1700 that provides for load distribution is illustrated. System 1700 can include a module 1702 for receiving a resource assignment from a serving access point and a module 1704 for generating output data for reverse link transmission board upon resources assigned. Resource assignment can include resources such as time, frequency and/or code.

System 1700 can also include a module 1706 for sending the reverse link transmission. The reverse link transmission can be received at the serving access point as well as any neighboring access points. After transmission system 1700 can wait for an acknowledgement. System 1700 can include a module 1708 for receiving an acknowledgement. System 1700 can include a module 1708 for receiving an acknowledgement indicating that the reverse link transmission was successfully received. The acknowledgement can be received from a serving sector or a neighboring sector. If no acknowledgement is received module 1706 can retransmit the reverse link transmission.

What has been described above includes examples of one or more aspects. It is of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating reverse link communication between a terminal and a non-serving sector in a wireless environment, comprising:
   transmitting assignment information to a terminal, wherein the assignment information includes a resource allocated to the terminal by a serving sector, and a subcarrier allocated to the terminal is determinable as a function of the assignment information;
   transmitting the assignment information to a neighboring sector in an active set of the terminal prior to initiation of a handoff of the terminal from the serving sector, wherein the assignment information is configured to enable the neighboring sector to process a reverse link transmission from the terminal based at least in part upon the assignment information while the serving sector continues to serve the terminal, and the neighboring sector identifies the subcarrier allocated to the terminal as a function of the assignment information and detects the reverse link transmission based at least in part upon the identified subcarrier;
   coordinating processing of the reverse link transmission with the neighboring sector to effectuate load distribution, comprising receiving a notice that the neighboring sector has begun processing of the reverse link transmission, and terminating processing of the reverse link transmission with the serving sector in response to the notice;
   terminating processing of the reverse link transmission with the serving sector in response to receiving a notification that the neighboring sector successfully completed processing the reverse link transmission with the neighboring sector; and
   processing the reverse link transmission with the serving sector in response to receiving a notice of failure in processing the reverse link transmission by the neighboring sector.

2. The method of claim 1, further comprising generating the assignment information using orthogonal frequency division multiplexing.

3. The method of claim 1, wherein the assignment information is provided to the neighboring sector using backhaul signaling.

4. The method of claim 1, further comprising sending an acknowledgement indicating successful processing of the reverse link transmission to the terminal.

5. The method of claim 1, further comprising identifying the terminal for soft handoff.

6. The method of claim 1, further comprising identifying the neighboring sector for provision of the assignment information based at least in part upon an active set for the terminal.

7. The method of claim 1, further comprising:
   receiving a transmission from a neighbor terminal supported by the neighboring sector;
   storing the neighbor transmission;
   receiving neighbor assignment information associated with the neighbor transmission; and
   processing the neighbor transmission as a function of the neighbor assignment information.

8. The method of claim 1, further comprising forwarding the assignment information to all neighboring sectors in the active set of the terminal prior to initiation of a handoff of the terminal from the serving sector.

9. The method of claim 1, wherein transmitting the assignment information to a neighboring sector comprises transmitting information relating to a plurality of distinct orthogonal frequency subcarriers used in the reverse link transmission from the terminal.

10. An apparatus that facilitates other sector communication in a wireless environment, comprising:
    a processor that executes instructions for:
    receiving, at a neighboring sector, prior to initiation of a handoff of a terminal from a serving sector, assignment information for the terminal from the serving sector that supports the terminal, wherein the assignment information includes a resource allocated to the terminal by the serving sector, and a subcarrier allocated to the terminal is determinable as a function of the assignment information, wherein the neighboring sector is in an active set of the terminal;
    detecting a communication provided by the terminal at the neighboring sector based at least in part upon the received assignment information and identifying the subcarrier allocated to the terminal as a function of the received assignment information while the serving sector continues to serve the terminal;
    coordinating processing of the communication with other neighboring sectors to effectuate load distribution, comprising receiving a notice that another neighboring sector has begun processing of the communication, and terminating processing of the communication with the serving sector in response to the notice;
    terminating processing of a reverse link transmission with the serving sector in response to receiving a notification that the neighboring sector successfully completed processing the reverse link transmission with the neighboring sector; and
    processing the reverse link transmission with the serving sector in response to receiving a notice of failure in processing the reverse link transmission by the neighboring sector.

11. The apparatus of claim 10, wherein the assignment information includes a channel assigned to the terminal based upon orthogonal frequency division multiplexing.

12. The apparatus of claim 10, wherein the instructions are further for transmitting an acknowledgement to the serving sector indicating successful processing of the communication.

13. The apparatus of claim 10, wherein the instructions are further for transmitting an acknowledgement to the terminal indicating successful processing of the communication.

14. The apparatus of claim 10, wherein the memory buffers the communication for processing upon receipt of the assignment information.

15. The apparatus of claim 14, wherein the instructions are further for processing the stored communication incrementally.

16. The apparatus of claim 10, wherein the instructions are further for notifying the serving sector of commencement of processing the communication.

17. The apparatus of claim 10, wherein the instructions are further for forwarding the assignment information to all neighboring sectors in the active set of the terminal prior to initiation of a handoff of the terminal from the serving sector.

18. The apparatus of claim 10, wherein the assignment information comprises information relating to a plurality of distinct orthogonal frequency subcarriers used in the reverse link transmission from the terminal.

19. An apparatus that facilitates other sector communication, comprising:
- means for transmitting, by a transceiver, a resource assignment to a terminal, wherein the resource assignment includes a resource allocated to the terminal by a serving sector, and a subcarrier allocated to the terminal is determinable as a function of the resource assignment;
- means for providing, by a processor, a resource assignment information to a neighboring sector in an active set of the terminal prior to initiation of a handoff of the terminal from the serving sector, wherein the resource assignment information is configured to enable the neighboring sector to process a reverse link transmission from the terminal based at least in part upon the resource assignment information while the serving sector continues to serve the terminal, and the neighboring sector identifies the subcarrier allocated to the terminal as a function of the resource assignment information and detects the reverse link transmission based at least in part upon the identified subcarrier;
- means for coordinating, by the processor, processing of the reverse link transmission with the neighboring sector to effectuate load distribution, comprising receiving a notice that the neighboring sector has begun processing of the reverse link transmission, and terminating processing of the reverse link transmission with the serving sector in response to the notice;
- means for terminating, by the processor, processing of the reverse link transmission with serving sector in response to receiving a notification that the neighboring sector successfully completed processing the reverse link transmission with the neighboring sector; and
- means for processing, by the processor, the reverse link transmission with the serving sector in response to receiving a notice of failure in processing the reverse link transmission by the neighboring sector.

20. The apparatus of claim 19, further comprising means for generating, by the processor, the resource assignment using orthogonal frequency division multiplexing.

21. The apparatus of claim 19, wherein the resource assignment information is provided to the neighboring sector using backhaul signaling.

22. The apparatus of claim 19, further comprising means for sending, by the transceiver, an acknowledgement indicating successful processing of the reverse link transmission to the terminal.

23. The apparatus of claim 19, further comprising means for identifying, by the processor, the terminal for soft handoff.

24. The apparatus of claim 19, further comprising means for identifying, by the processor, the neighboring sector for provision of the assignment information based at least in part upon an active set for the terminal.

* * * * *